May 9, 1944.  W. M. SCOTT, JR  2,348,228
CIRCUIT BREAKER
Filed June 10, 1940  9 Sheets-Sheet 5
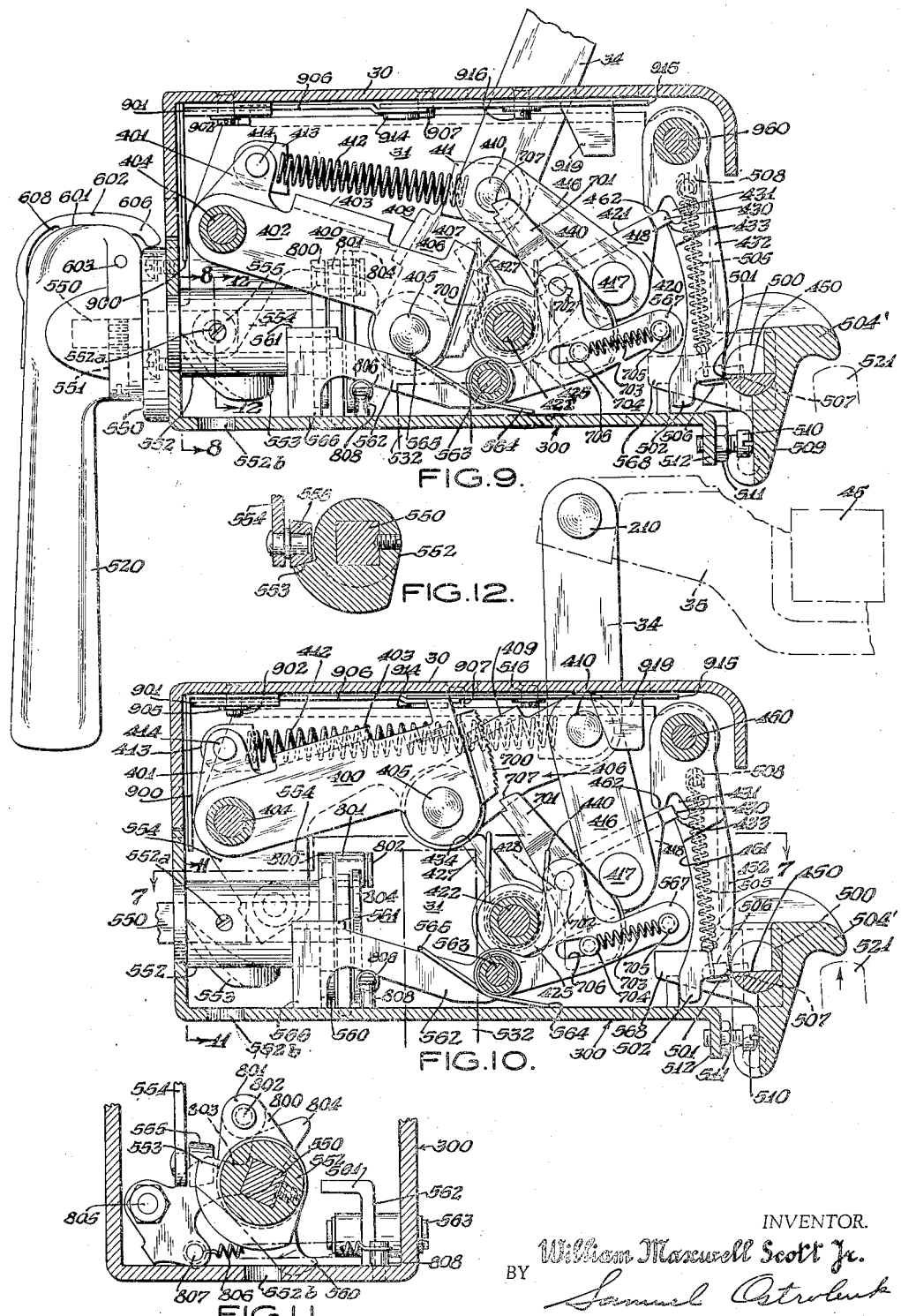
INVENTOR.
William Maxwell Scott Jr.
BY Samuel Ostrolenk
ATTORNEYS

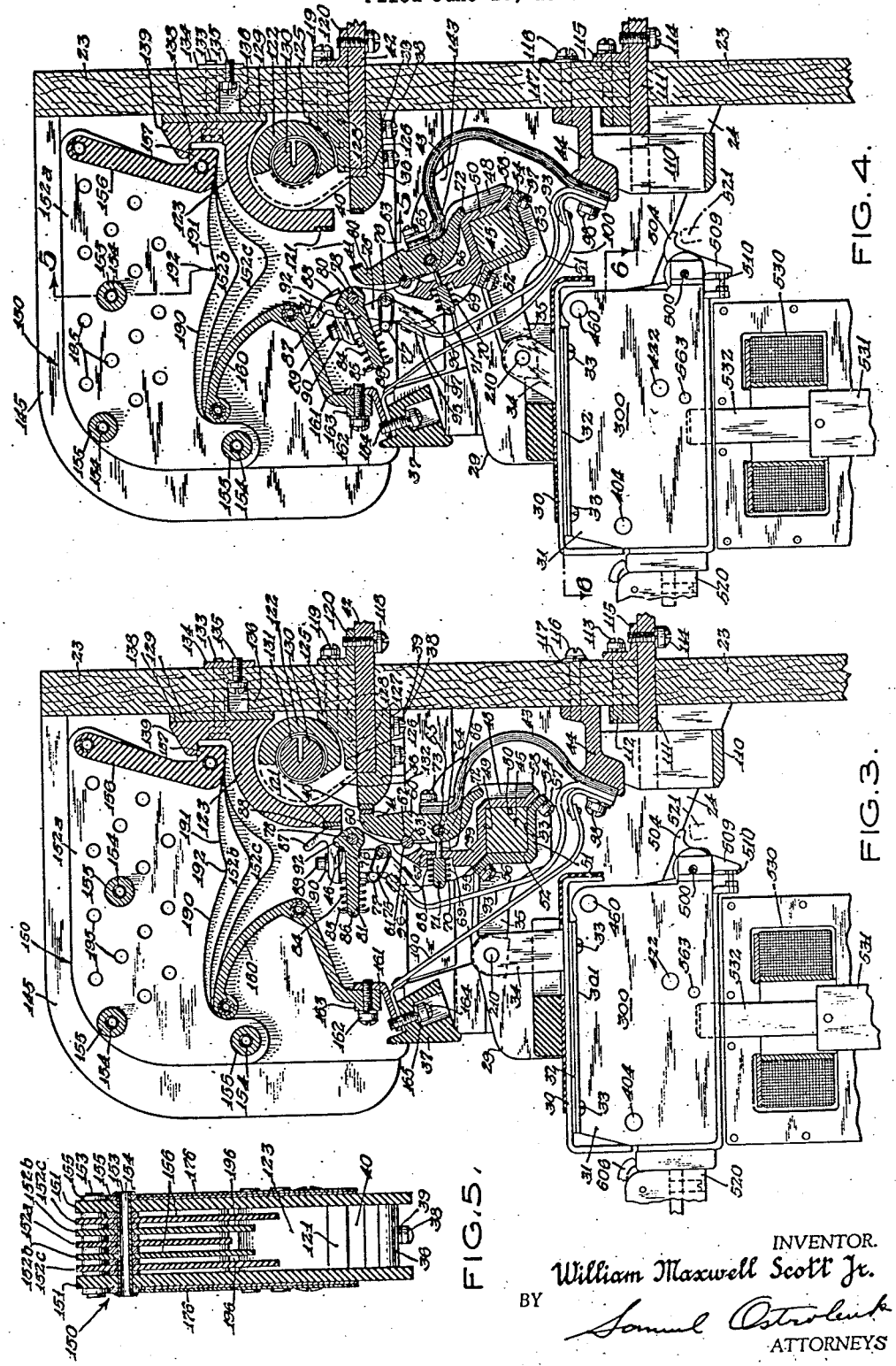

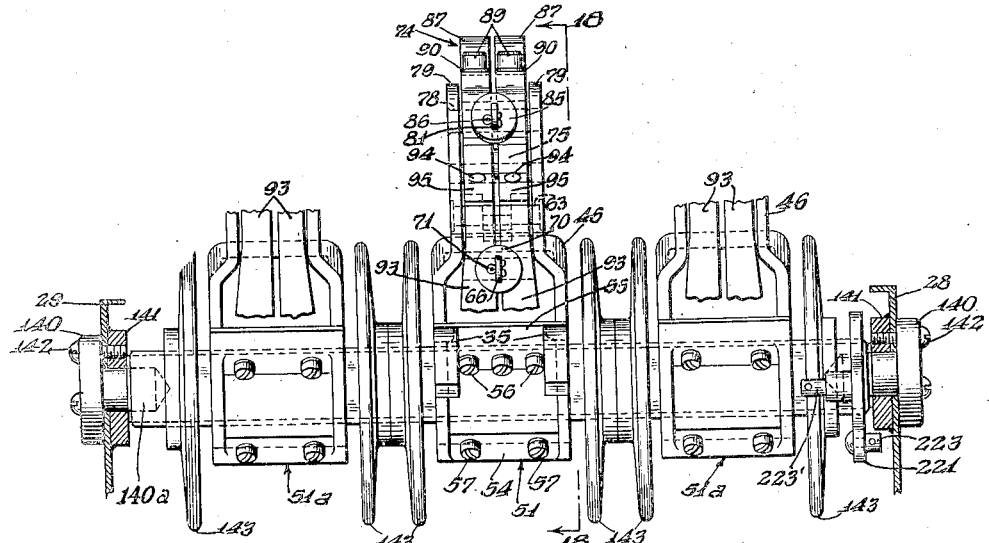
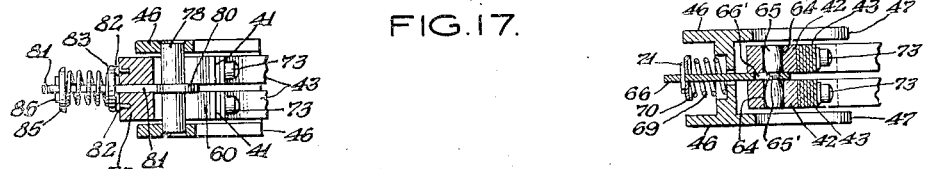
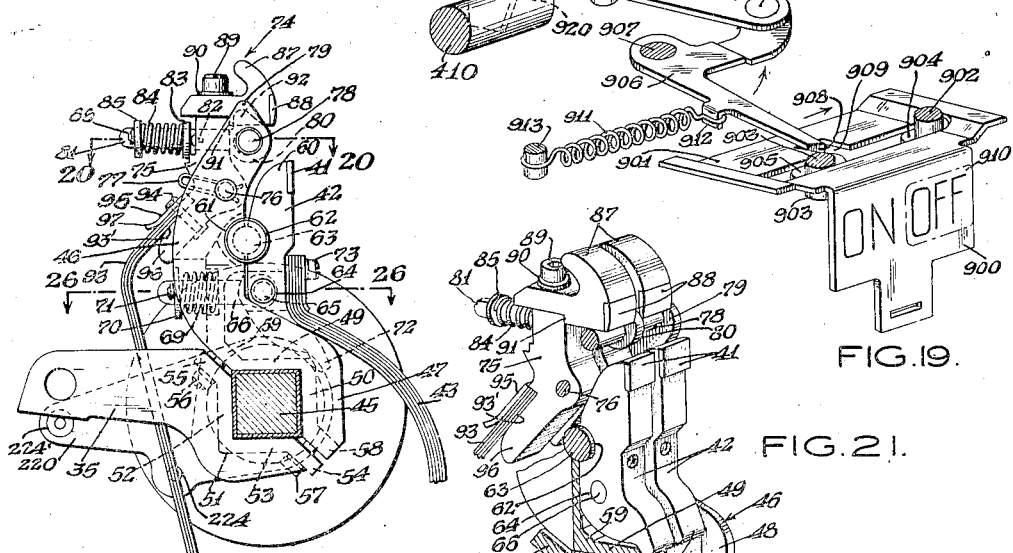

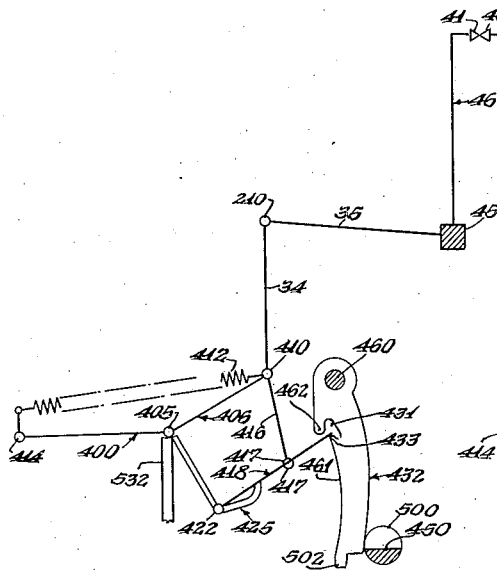

Patented May 9, 1944

2,348,228

UNITED STATES PATENT OFFICE 2,348,228

CIRCUIT BREAKER

William Maxwell Scott, Jr., Bryn Mawr, Pa., assignor to I. T. E. Circuit Breaker Company, Philadelphia, Pa., a corporation of Pennsylvania Application June 10, 1940, Serial No. 339,687

4 Claims. (Cl. 200—144)

This invention relates to circuit breakers and operating mechanism thereof including contact structures, magnetic blow-out devices, arc quenchers and closing and tripping mechanisms, and to the integration of all of these elements into a single unit for composite operation.

In the operation of circuit breakers, the efficiency of toggle arrangements for effecting tripping and closing of the contact members has long been recognized and has been employed in various combinations with different types of latching and tripping arrangements.

An important element of the present invention is to provide in connection with a toggle closing mechanism novel means whereby the movable contacts may be operated either manually or electrically in order to effect the closing operation; and correspondingly novel means whereby either a manual operation or an automatic electrically induced operation may selectively effect the tripping of the mechanism and the fast opening of the contacts.

An important element of toggle mechanisms is the latch or other engaging means which holds the same in predetermined locked position and which should be so designed as to obviate slipping during closing or any response to the jar of the solenoid or any other vibration, while at the same time being required for tripping.

In the present invention the problem is solved not by the use of a single latch or trip alone but by a combination of latches; primarily by what we have termed a primary latch held in position by a secondary latch and engaging as well the tip of a latch lever. This apparent multiplication of latches does not, as might at first be suspected, increase the complexity of the mechanism but rather simplifies the operation and makes it possible to provide for an automatic resetting of the latches immediately after the actual tripping operation. In thereafter reclosing the circuit breaker the only operation necessary is the actual movement of the contact by the toggle means herein described.

An object of this invention, therefore, is, in a circuit breaker closing mechanism of the toggle type, the provision of a primary latch for engaging a suitable latch lever of the toggle mechanism and a secondary latch for maintaining the primary latch in latching position.

A second and equally important object of the present invention is the novel arrangement of the latch lever, the primary latch and the secondary latch in such a manner that the very process of tripping the contacts open sets the members in such position that the latches are automatically reset immediately after the tripping operation is completed.

It thus becomes important that the cooperation between the two latches in the first instance and between the primary latch and the latch lever be such that some movement of a portion of the toggle mechanism relative to these members have a resultant force effective to reengage these members while at the same time in no way impeding the tripping operation.

Accordingly, a further important object of the invention is the provision of means whereby relatively slight motions result in the initiation of the tripping operation and whereby the tripping operation itself results in the resetting of the engaging means or latches.

Two desirable features of a circuit breaker are first, the contacts should open in the shortest possible time, and, second the work demanded of the automatic tripping device in releasing the latch should be a minimum. In order to have a circuit breaker open quickly, it is necessary to provide spring powerful enough to give the required acceleration. The opening force of the springs and the contact pressure is transmitted through the mechanism to the latch surface when the circuit breaker is closed. In order to use powerful springs and yet have a small pressure on the latch surface, it is necessary to provide relatively great mechanical advantage. The simplest form of mechanical advantage is to use a lever of considerable length, the force involved being applied to this lever and the end of the lever restrained by the latch. The greater mechanical advantage required, the longer this lever will be, the latch engaging the end farthest from the fulcrum. In providing mechanical advantage in this form the length of lever introduces a mass and increases the moment of inertia of the mechanism. This mass must be accelerated during opening and such a construction would materially delay the opening of the contacts. It is, therefore, desirable to design a mechanism giving the required mechanical advantage and yet introducing the minimum inertia in the parts. This was the guiding element in producing the design of the present invention.

In the present invention it was found that it was not necessary to use a large mechanical advantage in the parts effecting the closing of the contacts, but it was necessary to introduce a large degree of mechanical advantage as far as the latches were concerned. Therefore, two latches were used in series, one latch restraining the other. The primary of these latches is designed to resist a high percentage of opening force of the contact mechanism and to be able to automatically release upon disengagement of the secondary latch. This primary latch was made with the most economical use of material to make it light, the metal being in tension and the area of engagement being relatively wide and yet having relatively small overlap so that a very short movement of the latch will disengage it from the closing mechanism.

The secondary latch engages the primary latch to maintain it in the holding position and the mechanical advantage produced by this system gives a very light load on the secondary latch. The secondary latch can, therefore, be released with a very small amount of energy.

In connection with circuit breaker mechanism it is found extremely desirable to have the restraining latches engaged before the closing movement commences, and to have the latching members stationary during this movement.

In certain earlier circuit breaker designs an actuated lever was held together by means of a latch so that during closing the two levers moved together, being maintained in their relative positions by the engagement of the latch. Due to centrifugal force or shock or other influences during the closing operation, it was very easy for these latches to become disengaged when this action was not desired. In the present invention the latches are engaged immediately after the opening of the contacts and remain stationary throughout subsequent closing so that there are no outside secondary forces introduced which might cause them to slip.

We have therefore arranged a latch lever in connection with the toggle mechanism in such a manner that when the contacts are closed and the toggle mechanism is under collapsing pressure by reason of a spring or other means, the latch lever exerts a pressure upon that portion of the primary latch which engages it.

We also provide that this pressure upon the primary latch be in a direction so that if the primary latch were permitted to yield to it, there would be a disengagement of the latch lever and the primary latch. In order temporarily to prevent this yielding of the primary latch, we provide a secondary latch which is subject only to the pressure generated by the tendency of the primary latch to move or yield out of position.

The manual or electrical tripping means need, therefore, merely disengage the secondary latch, whereupon the primary latch may yield to the existing pressure upon it by the latch lever and permit the disengagement of the latch lever and the resultant instability of the toggles will return the mechanism to its original position, thus opening the contacts.

Upon release of the secondary latch, the primary latch is moved to a second position under the force exerted by the latch lever upon the holding force of the primary latch. In this second position, the holding surface is moved from engagement with the latch lever which latter moves to open circuit position under the influence of the circuit breaker opening springs. During this movement a surface of the latch lever maintains engagement with the primary latch so that the latter is maintained in its second position. In this second position the primary engages the secondary latch to prevent its returning to engaged position.

We further provide a means on the primary latch and an arrangement of the latch lever with the toggle mechanism so that as the toggles return to their original position, the latch lever no longer exerts a pressure in the original direction which caused the yielding of the primary latch but is caused to exert a pressure in the opposite direction causing it to rise up and engage another portion of the primary latch, reset it, and engage the latching portion thereof.

When the primary latch is thus withdrawn from its yielded position to the original engaged position, nothing prevents the return of the secondary latch to its original engaged position and a simple spring may be utilized for this latter purpose.

An important object of the present invention, therefore, is the arrangement of a latch lever, a primary latch and a secondary latch so that when the circuit breaker is closed, a force is exerted by the latch lever upon the primary latch in one direction and so that immediately subsequent to the tripping operation, the force is exerted by the same latch lever in an opposite direction in order to reset all of the latches.

The tripping mechanism and the arrangement thereof is fully set forth in the following specification and drawings and other objects and uses and arrangements thereof will be more clearly understood therefrom.

In cooperation with this type of toggle mechanism and particularly in order to cooperate with a type of toggle mechanism where a plurality of toggles are used and wherein none of the knuckles or knee pins of the toggles pass through center and where, therefore, a locking action is not obtained by means of the inherent nature of the toggle itself but by means of abutments or latches, it becomes important that the contacts themselves be so arranged that they may be effectively locked in position when they are in the closed circuit relation.

Accordingly, an important object of the present invention is the mounting of the main contacts not directly upon the contact arm itself but upon an auxiliary contact lever which has an independent fulcrum of its own upon the contact arm and which by means of a compression spring operating not directly upon the contact end of the lever but upon the opposite end of the contact lever tending to raise it, tends to increase the pressure between the moving contact and a stationary contact.

This principle may be applied as well to the arcing contact which may be mounted upon the main contact arm but also is not mounted directly thereon but is mounted upon an auxiliary arcing contact lever which has its fulcrum upon the main contact arm and which by means of a compression spring is held in close engagement with the stationary arcing contact.

In this manner and by this arrangement of auxiliary levers upon the main lever and by the further arrangement of the compression springs in connection with the auxiliary levers, the fact that knee pins or knuckles of the various toggles do not pass through center to effect a normal locking action of the average toggle is compensated.

In this manner also the toggles are left unstable and biased towards opening position rather than towards closed position so that in the event of any disengagement of any of the members by reason of any operating difficulty of any kind, the tendency of the toggles will be to force the contacts open rather than to force them into tighter arrangement with each other (as would be the case in a mechanism where the toggles were required to pass through center in order to effect the closing operation).

A positive abutment must therefore be utilized in connection with the toggle mechanism in order to hold the knee pin thereof in position against the tension of the toggle spring when the contacts are closed. The operation of the latches hereinbefore described operates also to remove the abutment from the supporting position and thus permits the circuit breaker to open. This arrangement is nevertheless such that should any difficulty occur in operation, the toggle mechanism is (even in closed position) biased towards opening so that the contacts would tend to open.

However, where a circuit breaker of this type is to be used under conditions subject to mechanical shocks and stresses as, for instance, in naval vessels of various types, it becomes important that the mechanical shocks to which such vessels and the equipment thereof are subject in normal operation as well as during actual manoeuvering and firing operations be not permitted to result in the accidental opening of circuit breakers and the resultant temporary cessation of operation of important apparatus.

Accordingly, the positive abutment herein described for support of the toggle mechanisms in their unstable positions is of more practical value than any over-center arrangement which may by some mischance be vibrated through center and toward opening position. The tripping operation is not interfered with since in such arrangement we contemplate the movement of the abutment out of supporting position by the latch lever.

In circuit breakers of this type wherein toggle mechanisms are permitted to rapidly open the contacts and wherein substantial currents may nevertheless flow, arcing across the contacts as they open and even after they may be opened presents a serious problem. The main contact may be protected by an arrangement wherein the arcing contact is caused to open an instant after the main contact so that whatever arc is established would tend to pass between the arcing contacts. The arcing contacts may be made readily replaceable and of relatively inexpensive materials.

The protection of the main contacts therefore insures that when the contacts are re-engaged once more in closed circuit position, the current may flow freely therebetween without undue heating.

As a further protection, however, a magnetic blow out coil may be provided and the stationary arcing contact may actually be mounted on or immediately over the coil to bring the arc more closely under the influence of the magnetic blow out means. The movable arcing contact as it opens may come into arcing relation with a stationary arcing horn to which the arc may be transferred.

Stationary magnetizable plates on either side of the contacts may engage the core of the blow out coil so that the magnetic field may extend in a predetermined manner substantially through the entire space occupied by the arc and thus cause the arc to move in a predetermined direction in accordance with the current flow.

The magnetizable plates may be magnetized not merely by their contact with the core of the magnetic blow out coil; but the arc itself, while it is in existence, may itself constitute virtually a half turn coil which energizes the magnetic blow out plates and results in a movement of the arc along the arcing horns in a predetermined direction.

An important object, therefore, of the present invention is to so arrange a magnetic blow out coil and magnetizable blow out plates in proximity to the position of the arc and to the arcing horns so that the magnetic fluxes generated by the magnetic blow out coil as well as by the current of the arc itself may cause the arc to move in a predetermined direction away from its original position.

The arrangement of the arcing horns so that they separate in the direction in which the arc is forced to move serves further to attenuate the arc.

And finally in this path of movement of the arc, we interpose an arc quenching device consisting preferably of plates of fibrous material between which the ionized gases forming the arc are squeezed and brought into contact with cooling and de-ionizing surfaces which serve to deionize the gases to extinguish the arc.

An important object of the present invention, therefore, is the arrangement of an arc quencher having a series of parallel fiber plates so arranged that the arc may be forced longitudinally between them for de-ionization of the gases and the extinguishment of the arc.

In the operation of circuit breakers and switch gear of various types, particularly where such mechanisms control the operation of a motor, it has frequently been found that the operator thereof will attempt to "inch" a motor into starting by just touching the contacts together and opening them slightly, and then attempting to close them once more. Such operations have well known dangerous possibilities which need not here be enumerated, the important element being that it is essential in ordinary operation that some provision be made for preventing such attempts which may lead to destruction of the circuit breaker or of the motor which it controls or which may in more ordinary cases lead to more rapid deterioration of the contacts.

Accordingly, an object of this invention is to provide primarily in connetcion with the toggle closing mechanism a back up trip which will serve automatically to trip the circuit breaker open as soon as any even slight reverse movement occurs during the closing operation.

In the operation and use of circuit breakers and switch gear of various types, it often becomes important to disassemble the same or at least to remove parts thereof in order to obtain access to various portions of the circuit breaker for replacement or repair. We have attempted in the present invention to so arrange each of the parts that they may be readily removable without any complicated operations whatever.

Thus the entire arc quencher assembly including the magnetic pole pieces of the blow out coil may be removed after rotating a single screw. The entire contact assembly may be removed after having simply removed the two outer bearings of the contact shaft and the single pin connecting the contact shaft with the toggle mechanism and removing the flexible conductors from the lower terminal. And even here the link between the toggle mechanism and the contact shaft is hinged sufficiently to permit the entire contact assembly to be rotated outwardly to permit inspection and repair thereof.

Access to principal leads and attachment thereof in operative position is provided for by means of a single screw and the entire toggle and latching mechanism is contained within a housing which may readily be removed by the rotation of the screws attaching it to the shelf.

An important object, therefore, of the present invention is the arrangement and integration of the parts thereof in such a manner as to facilitate assembly and disassembly thereof in manufacture, operation, replacement and repair.

In the operation and use of an integrated unit of this type, it becomes extremely important to provide and integrate with such a unit various safety factors which will tend towards fool-proof operation.

Accordingly, it is an important object of the present invention to provide a means for locking the circuit breaker in tripped position so that no unauthorized operator may effect a closing thereof and it is a preferred object that said locking means be in connection with or even a part of the manual tripping means so that any person attempting an unauthorized closing will be aware that the means has been set to prevent such closing. Such locking device precludes both manual and electrical operation.

Other objects of the present invention comprise the provision of suitable signalling devices and means integrated and connected with the various parts of the circuit breaker mechanism for indicating the relative position of each of the members thereof.

There are many other objects and uses of the present invention and of the combinations and elements herein set forth. Many of them have already been pointed out. Many others will in part be apparent and where not intrinsically apparent will be pointed out in the following description and drawings, in which:

Figure 3 is a cross-sectional view on line 3—3 of Figure 2 showing the circuit breaker in closed circuit position.

Figure 4 is a view corresponding to that of Figure 3 showing the circuit breaker in open circuit position.

Figure 5 is a cross-sectional view on line 5—5 of Figure 4 showing the arrangement of the arc quencher.

Figure 9 is a cross-sectional view partly in elevation taken on line 9—9 of Figure 6 showing the position of the members when the contacts are open.

Figure 10 corresponds to Figure 9 but shows the position of the members when the contacts are closed.

Figure 8:
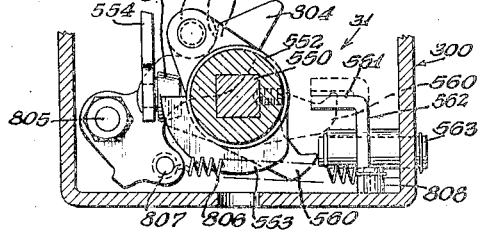
Figure 8 is a cross-sectional view partly in elevation taken on line 8—8 of Figure 9.

Figure 11 corresponds to Figure 8 and is a cross-sectional view on line 11—11 of Figure 10, also showing a position of the members during a closing operation.

Figure 12 is a cross-sectional view on line 12—12 of Figure 9.

Figure 13:
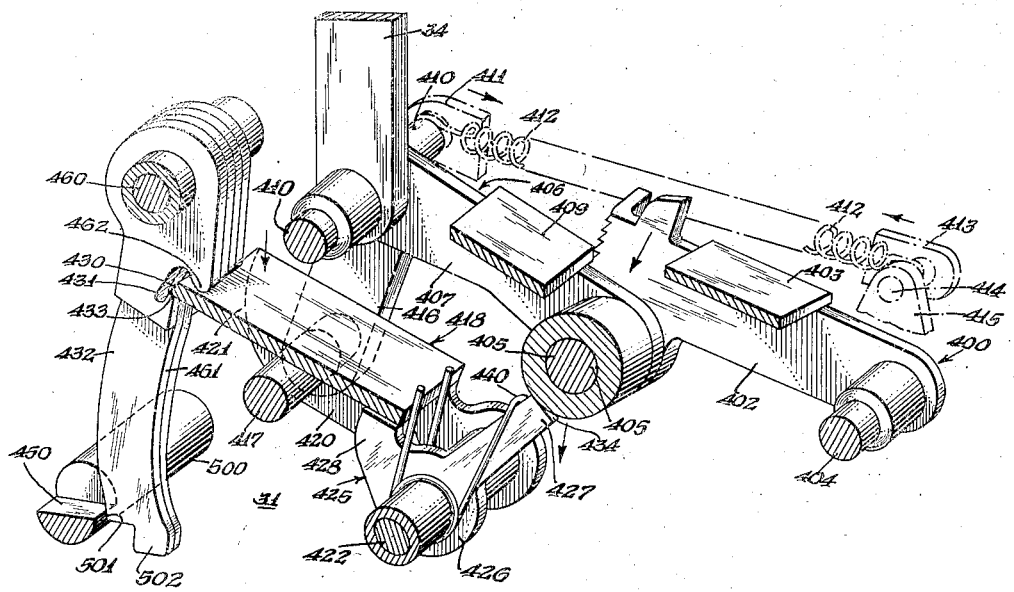

Figure 13 is a schematic view in perspective of the toggle and latch mechanisms of Figures 6, 7, 9 and 10 when the contacts are closed.

Figure 14:
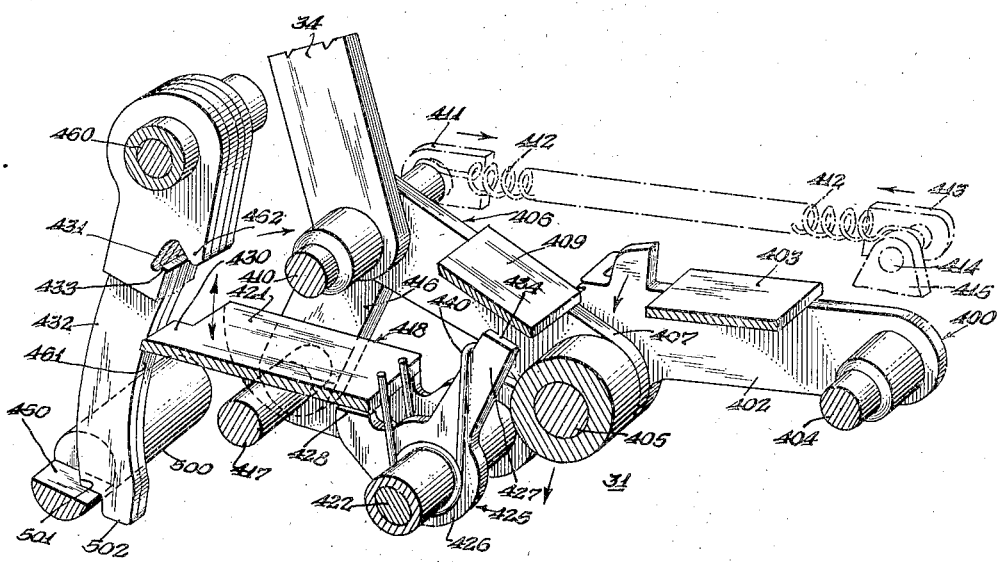

Figure 14 is a schematic view in perspective corresponding to the construction of Figure 13 but showing the toggle mechanisms during one instant of the tripping operation.

Figure 15:
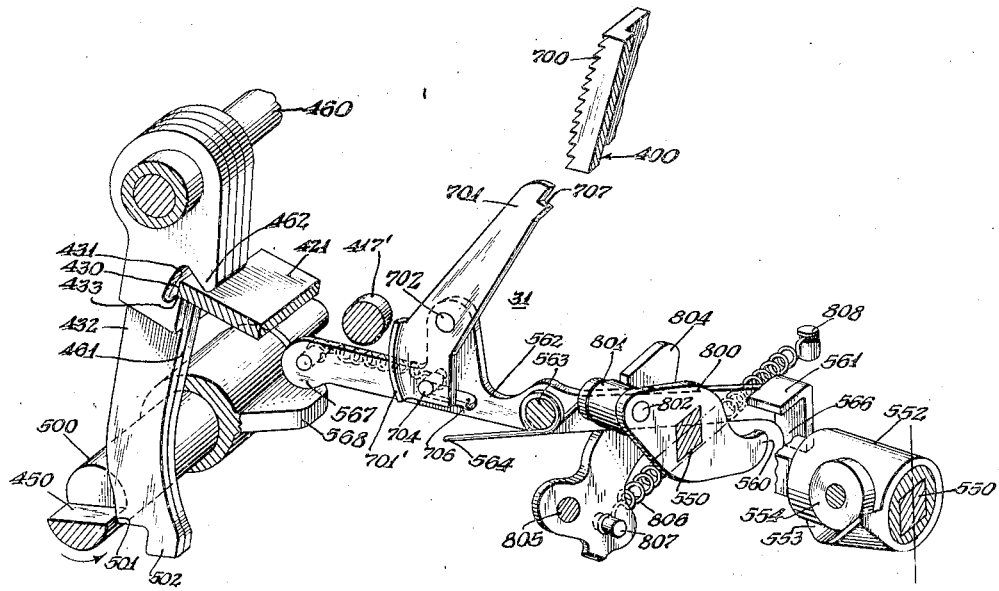
Figure 16:
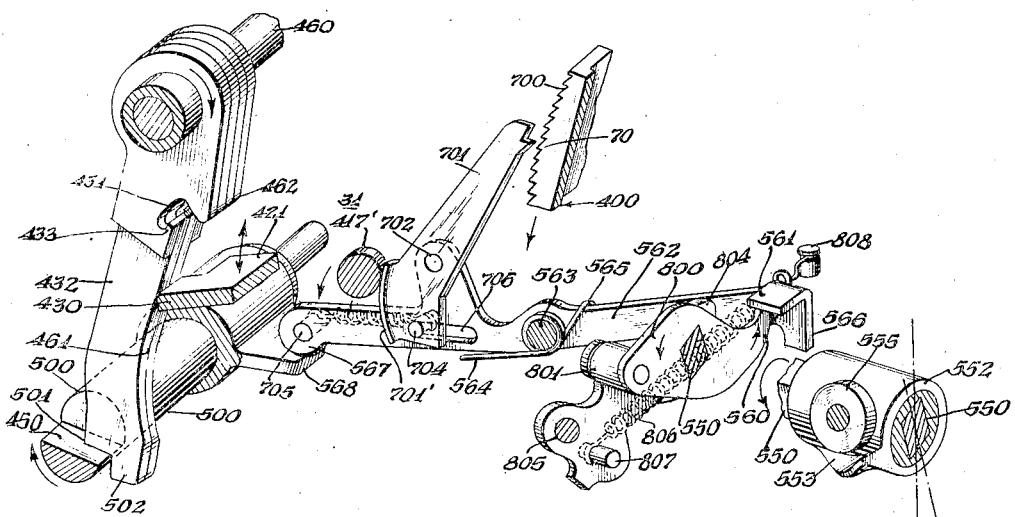

Figures 15 and 16 are schematic views in perspective showing the back-up trip mechanism and manual trip mechanisms and the combination thereof with the latching mechanisms of the members of Figures 6, 7, 9 and 10.

Figure 17 is a view of the back of the contact supporting shaft showing the back of the contact arms.

Figure 18 is a cross-sectional view on line 18—18 of Figure 17.

Figure 19 is a schematic view in perspective illustrating the on-off indicator and the operation thereof.

Figure 20 is a cross-section of the contact assembly of Figure 18 taken along line 20—20.

Figure 21 is a view in perspective showing the contact surfaces.

Figures 22, 23, 24 and 25 are diagrammatic representations of various steps in the operation of the toggle mechanism.

Figure 26 is a cross-sectional view on line 26—26 of Figure 18.

Referring now to Figures 1, 2, 3 and 4, we have here shown a three pole circuit breaker comprising the elements of the present invention. The circuit breaker consists of a group of pole units 20, 21, 22 (Figure 2) mounted on the face of an ebony, asbestos or slate panel 23 which forms the mounting plate of the entire circuit breaker arrangement.

Main supporting members

Figure 1:
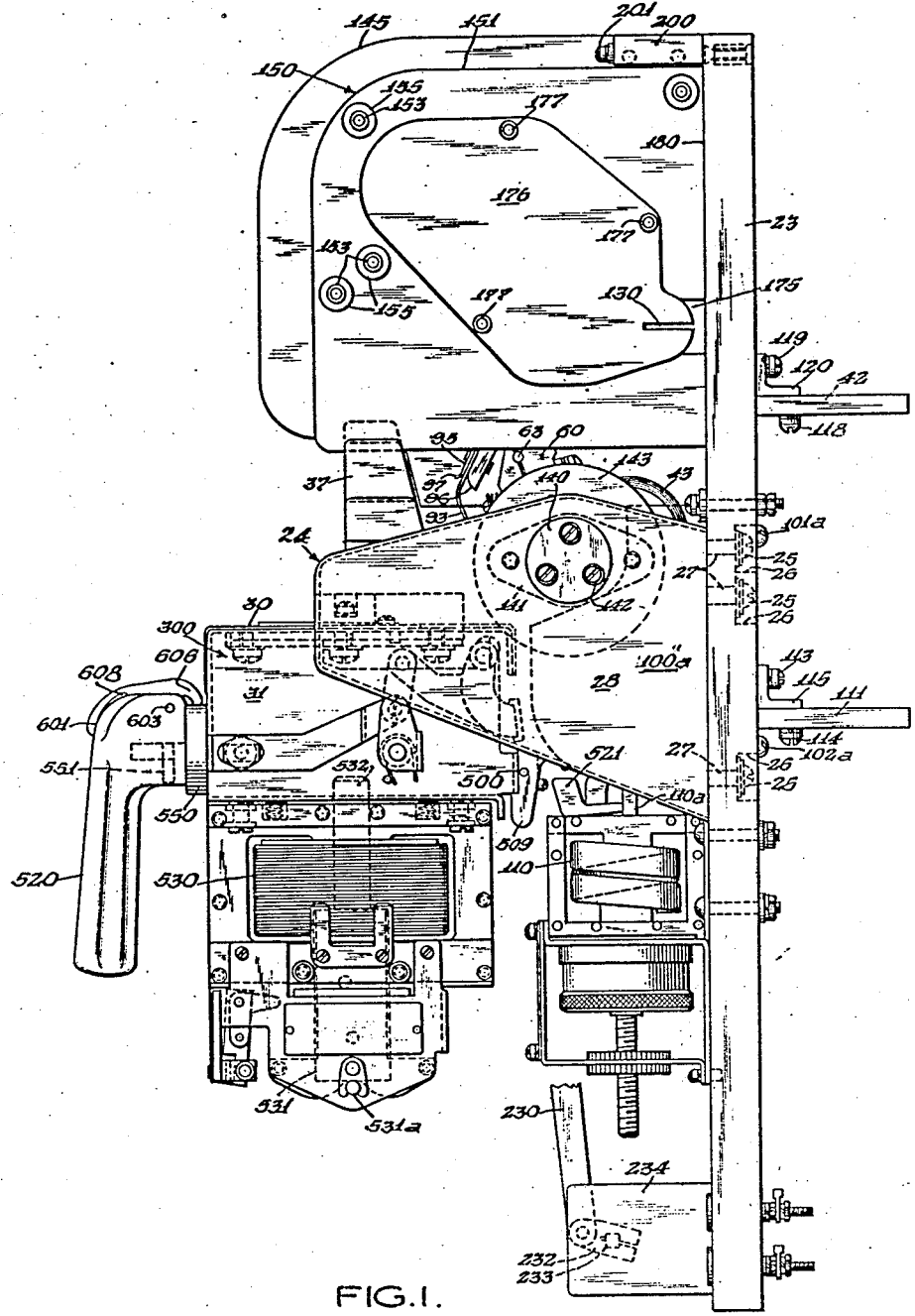
Figure 1 is a side elevation of the circuit breaker of our invention.

The main bracket or housing 24 which supports the operating members is secured to the panel 23 by means of screws 25, 25 the heads of which are recessed in openings 26, 26 in the back of the panel 23 and which pass through the perforations 27, 27 in said panel to engage the main bracket 24 (Figure 1).

Figure 2:
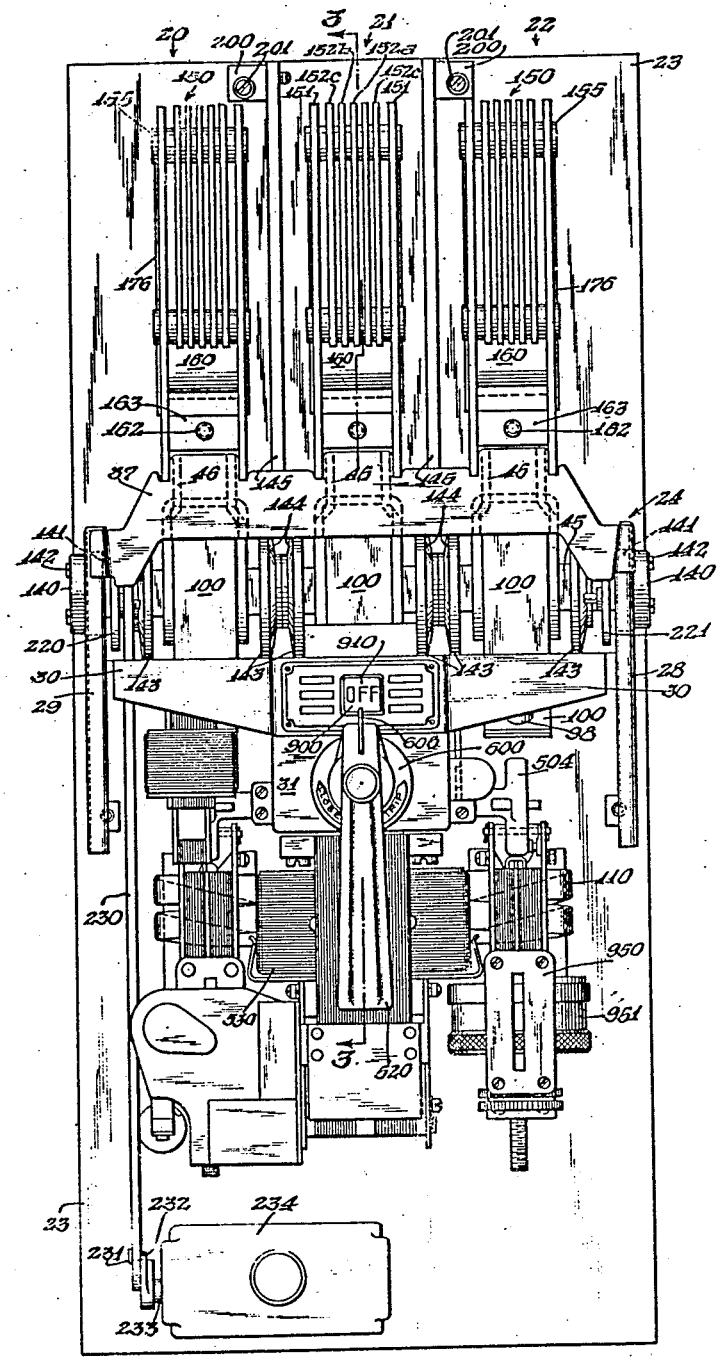
Figure 2 is a front view of the circuit breaker arrangement of Figure 1.

As seen in Figures 1 and 2, the main bracket or housing preferably comprises two flanged side plates 28 and 29 which extend on each side of a horizontal shelf 30 to which they are welded. The operating mechanism 31 comprising the toggles and other elements hereinafter described is bolted to the lower side of the shelf 30, the housing 300 of the said operating mechanism comprising flanges 32, Figures 3 and 4, through which bolts 33 may be passed to engage the shelf 30.

Link 34 of insulating material connects the operating mechanism 31 to the lever 35 which is secured to the contact shaft 45 and is rotatable therewith. As seen more particularly in Figures 3 and 4, the stationary contacts 36 and their back connection stud assembly are mounted on the panel above the housing or supporting bracket 24 and support the inner end of the arc chutes in the manner hereinafter described.

A bridge 37 of insulating material secured to the outer end of the main bracket 24 supports the outer end of the arc chutes in the manner hereinafter described.

Main and arcing contacts—The stationary main contacts

The stationary main contacts 36 are bolted to the connecting stud 42 by means of the bolts 38 and the washers 39. The connecting stud 42 passes through the back panel 23 and is suitably arranged so that appropriate circuit connections may be made thereto. The path of the main current when the contacts are closed, as seen in Figure 3, is through the connection stud 42, the stationary contact 36, the stationary contact tip 40, the movable contact tip 41, the contact lever 60 carrying the flexible connection 43 which in turn is electrically connected to the member 44.

Movable contacts support

The movable contact shaft 45 is preferably a square steel bar covered with phenolic insulation molded in place and is rotatably supported in appropriate bearings as hereinafter described.

A contact arm for each pole is mounted on this shaft. The contact arm 46 is preferably a bronze casting reinforced by flanges 47 and 48. The lower end of the bronze casting which engages the square steel shaft is preferably formed in a V comprising the members 49 and 50 set at approximately right angles to each other so that they will engage the square sides of the shaft 45 to which they are to be clamped.

The clamping member 51 comprises also a V-shaped member having the sides 52 and 53 which likewise may engage the sides of the square steel shaft and comprising also flanges 54 and 55 through which bolts 56 and 57 may be threaded to engage the flange 58 and the flat portion 59 of the contact arm 56 in order to securely clamp the same to the contact shaft 45.

As will be noted, especially in connection with Figures 2 and 3, each of the main contact arms 46 may be secured to the contact shaft 45 so that rotation of the contact shaft 45 by the lever 35 will result in corresponding movement of the contact arms 46 for the purpose of opening or closing the circuit.

While any necessary number of contact carrying arms may be mounted upon the contact shaft as the specific circuit connections may require only one lever 35 is necessary for the opening and closing operations which result in rotation of the shaft 45 and the operation of the various contacts.

In order to obtain a balanced structure it is preferred that the lever 35 be secured to the shaft 45 substantially at the center so that the mechanism may be properly balanced.

Movable main contacts

Each contact arm 46 carries a pair of contact levers 60 formed and cut from a special copper extruded bar. Each of these two levers 60 (see especially Figures 3 and 4; see also Figure 17) carries at its upper end a silver nickel contact block 41 for engaging the stationary main contact tip 40. The back of the contact arm 46 has a part-cylindrical depression 61 and the front of each of the contact levers has a similar depression 62. A bronze pivot pin 63 is placed in these depressions (in the manner shown in Figures 3, 17 and 21). This pivot pin has flanges at each side and also a flange in the center between the two contact levers 60 in order to prevent any lateral movement of the members with respect to each other.

Each of the contact levers 60 is drilled at 64 so that a pin 65 may be inserted therein. The pin 65 is preferably of dumbell shape (as seen in Figure 26) and acts as an equalizing yoke between the two contacts 60—60. A link 66 engages the pin 65 between the two contact levers 60—60 and is extended up through a perforation 67 in the contact arm 46 into the recessed area 68 of said contact arm. A compression spring 69 forms the main contact spring and is retained in position between the base of the recess 68 and the spring cup 70 which is held in place on the spring link 66 by the cotter pin 71.

The spring link 66 in extending between the two main contact levers 60 has an eye 66' engages a groove 65' in the pin 65 in order to prevent its moving to either side.

When the main contacts are disengaged in the manner shown in Figure 4, the lower ends 72 of the main contact levers 60 press aaginst the contact arm 46 in the manner shown.

For simplified assembly the only element which retains the pin 63 in place is the pressure of the spring 69 upon the main contact lever.

In the closed position the pressure through the contact lever 60 between the spring 69 (bearing on the pin 65) and the contact 41 serves to maintain the adequate pressure necessary to hold the pin 63 in place. In the open position, the pressure of the bottom end 72 of the main contact lever 60 against the contact arm 46 and the pull of the compression spring upon the pin 65 of the lever 60 using the member 72 as a fulcrum serves to maintain the pin 63 in place.

This design of pivot provides long wearing surfaces. The spring link and pressure equalizing pin may be made of hard steel so that their area of engagement may be small. The area of engagement at the pin of the contact levers may be of relatively soft material.

The pivot pin engaged by the half cylindrical surfaces of the contact arm and the contact levers provides a maximum of area for the softer parts. This area could not be obtained in the same width of pin length by any other method.

If the levers were formed to rock in a groove in the arm, there would be copper and brass bearing surfaces which are far inferior to the steel pin between them.

During the closing movement there is no instant when there is any relaxation of pressure upon the pin 63, for until the main moving contact tip 41 is brought into contact with the stationary contact tip 40, the bottom end 72 of the contact lever 60 engages the contact arm 46 in the manner shown in Figure 4.

Only after the moving contact tip 41 is in engagement with the stationary contact tip 40 is there a transfer of the fulcrum or the base of pressure from the portion 72 to the tip 41. In such case, as has been seen in connection with the closed position of Figure 3, there is again sufficient pressure to maintain the pin 63 in place.

During the opening movement, pressure is maintained upon the pin 63 by reason of the fact that spring 69 by its pressure on pin 65 forces contacts 40 and 41 against each other until, in the rotation of the contact shaft 45, the end 72 of the contact lever presses against clamping portion 48 of the contact arm 46, whereupon the base of pressure is transferred from contact tip 41 to end portion 72. In this manner, the spring pressure is always exerted to maintain pin 63 in position.

The rotation of the main contact lever 60 about the pin 62 during the closing operation necessarily results in a slight sliding motion of the movable contact tip 41 with respect to the stationary contact tip 40 so that a wiping action occurs tending to clean the contacts.

As seen also in Figures 3 and 4, the back of the contact levers are drilled and tapped for the securing screws 73 in order to attach the flexible conductor 43 thereto.

The upper end of the flexible conductor 43 is slit so that separate screws 73 may attach the separate ends to the two separate contact members 60 to allow independent movement of the contacts. The arrangement of the lever arms above and below the contact pivot is such that during heavy current flow the magnetic forces set up will tend to increase the pressure between the moving and stationary contacts when the flow of current is between the stationary contact tip 40 and the movable contact tip 41.

By the use of two contact levers of this type for each pole of the circuit breaker, an adequate contact at each pole is ensured.

Movable arcing contacts

The arcing contacts 87 are mounted in the upper part of the contact arm 46, and are supported by arcing contact levers 75. The arcing contact levers 75 preferably are each cut from a bar of extruded copper and in this case also I have found it preferable to use a pair of such contacts and levers for a single pole. Each of the arcing contact levers 75 is pivoted on the pin 76 which is grooved between the contacts to take a hair pin spring 77 which serves to keep the pin 76 in center position. A second pin 78 is mounted in the top of the contact arm 46 between two upwardly extending flanges 79 thereof.

An appropriate bushing may be placed between the flanges so that the pin may be securely riveted over them without bending them. The eye 80 of the spring link 81 is placed over the bushing, the said spring link 81 extending beyond the back of the arcing contact levers 75.

Pins 82 having rounded heads (see Figure 18 as well as Figures 3 and 4) are driven into the upper part of the back of the arcing contact lever 75.

A spring cup 83 is pressed against these pins by the compression spring 84 which is held in place on the link 81 by the spring cup 85 at the opposite end which in turn is held in position by the cotter pin 86. The arcing contact 87 is mounted upon the arcing contact lever 75 and is preferably formed or cut from an extruded copper bar and is provided with a contact face 88 preferably of Elkonite silver which is soldered to the copper.

Each of the contacts 87 of each of the contact levers 75 is held in place upon its contact lever by a socket head cap screw 89 and lock washer 90. As will be seen more particularly in Figure 18, the contacts 87 are held against turning or other displacements by the shoulder 91 which engages a corner of the arcing contact lever 75. The ends of the contact arm flanges bear against the outer sides of the two arcing contacts and the projection 92 of the spring link separates the two arcing contacts 87—87 from each other, thus serving adequately to position them.

As is seen in Figures 3, 4 (and 18), the lower end of the arcing contact lever 75 is off-set at 93' to receive the end of a flexible conductor 93. The conductor 93 like the conductor 43 is also slit, the ends thereof being riveted at the off-set 93' to the arcing contact lever 75 by means of the rivet 94 passing through the washer plate 94.

The off-set 93' is curved away at 96 from the flexible conductor and the washer plate 95 is curved away at 97 therefrom for the purpose of preventing kinking during operation. This flexible conductor 93 is led down to the lower terminal block 44 to which it is connected by the same screws 98 that hold the main contact lead 43.

The main contact levers, in contact open position, are held against their fulcrums and against a stop on the arm by a compression spring at the back of the arm, acting on a link connected to the two contact levers between the fulcrum and the stop. The contact surface is at the top of the lever above the fulcrum. The flexible conductor is secured to the bottom of the lever below the fulcrum.

When the shaft and arm are moved to contact closed position, the contact ends of the levers are rotated about their fulcrums and pushed back from their advanced position, moving the bottom stop clear of the arm. This compresses the spring and increases the contact pressure. The use of a single spring and link between the two levers permits the pin to act as an equalizing yoke.

The attachment of the flexible conductor below the fulcrum causes the magnetic forces to balance about the fulcrum so that the contact pressure may remain the same or increase during fault current.

The auxiliary or moving arcing contacts are mounted at the top of the arm. In this case the spring is above the fulcrum and below the detachable contact tips. Equalization of pressure is arranged in the same way. Maintained pressure during fault or inrush current is provided in the same manner.

Overcurrent coil connections

It should also be noted that the flexible lead 100 from the arcing horn hereinafter described is also connected to the terminal block 44. It will thus be seen that the three flexible conductors 100, 93 and 43 are all led from the contact structure to the lower terminal 44 to which all three are or may be secured by the same screws and lock washers. The angle of the terminal and of the screw 98 is selected so that a repair man may reach these screws over the back edge of the bracket shelf 30.

The lower terminal or "pigtail" posts may have connected thereto a coil 110 which may energize an over-current magnet.

This coil may have a cross-section of copper and the requisite number of turns corresponding to the current rating of the circuit breaker, one terminal of the coil being connected to the lower terminal post 44 and the opposite end of the coil being connected to the back connection stud 111 which has the securing block 112 welded to it at the face of the panel 23.

The back connection stud 111 is held in place in the panel 23 by the screws 113 and 114 which pass through and engage the clip 115. The terminal post 44 is bolted in place on the panel 23 by means of the bolts 116 and lock washers 117. In other words, therefore, the current is not led directly to the back connection stud 111 but through the lower terminal post 44 and through the coil 110 of the over current magnet to the back connection stud 111 through which the connection is made to the circuit.

The coil 110 of the over current magnet is therefore connected in series with the contacts.

It might here be noted that the upper back connection stud 42 is likewise connected through the panel 23 by means of screws 118 and 119 engaging and passing through the clip 120 and is therefore held in position in the same manner as the lower back connection stud 111.

When the circuit breaker therefore is closed, the current flowing into the upper stud 42 enters the main contact block 36, passes through the main stationary contact surface 40 to the main movable contact surface 41 and into the main contact lever 60 passing therefrom through the flexible lead 43 to the lower terminal block 44 around and through the coil 110 to the lower back connection stud 111 and thence back to the circuit to which the same is connected.

The over-current coil 110 will thus be in series with the main contacts; and, after these are opened, with the arcing contacts; and, finally, with the arcing horns; since the leads 43, 93 and 100 each are connected to the pigtail post 44.

The arcing contact circuit is in parallel with the circuit through the main contact tips 40 and 41. The arcing contacts are designed to make before and separate after the main contacts during the closing and opening so that as is hereinbefore described, the arc particularly during the opening may be made between the arcing contacts so that the main contacts which carry the load should not be roughened or distorted to offer any substantial resistance to the passage of current.

*Blow out magnet and stationary arcing contact*

The current path from the arcing contact tip 88 to the arcing contact lever 75 and through the flexible lead 93 to the lower terminal block 44 has been described. The movable arcing contact tip 88 engages the stationary arcing contact tip 121. Current is led to the stationary arcing contact tip 121 in the following manner:

Current from the upper connection stud 42 flows into the lower terminal 125 of the blow out magnet coil 122 around the coil to its upper terminal 129 and thence to the stationary arcing contact 123. From the stationary arcing contact, the current flows to the stationary arcing contact tip 121, thence to the movable arcing contact tip 88, thence through the arcing contact lever 75, flexible lead 93, the terminal block 44, the coil 110, and the connection stud 111 in the manner hereinbefore described.

The arcing contacts, particularly the movable arcing tips 87—88, may readily be replaced after the same have become worn. When the circuit breaker is closed, the resistance of the circuit through the main contacts 36 and 60 is low as compared with the resistance through the arcing circuit so that a relatively small current flows through the latter.

The main stationary contact 36 is attached to the back connection stud as is the lower terminal of the blow-out magnet coil 122 by means of screws 38. Screws 119 passing through panel 23 serve to fasten the lower terminal of blow out magnet coil 122 and angle clip 120 to panel. Screws 118 in turn fasten back connection stud 42 to the angle clip 120. The electrical connection between the back connection stud 42 and the lower terminal 125 of the blow out magnet coil 122 is made by direct contact between the angle clip 120 and the screw 119 as well as by the direct pressure of the terminal 125 against the connection stud 42.

The coil consists preferably of a strip of bar copper wound in a helix, the lower end at 126 being sweated and pinned by pins 127 and 128 to the lower coil terminal 125 and the upper end being secured to a flat plate terminal 129 which lies against the panel 123. The coil is wound so that current flowing from the lower coil terminal to the upper coil terminal flows around the slotted cylindrical iron core 130 in a clockwise direction in the views of Figures 3 and 4.

A fiber tube 131 insulates the core 130 from the coil 122. Insulated side plates 132 are fastened on each side of the coil terminals. The arcing terminal 123 also cut from an extruded brass bar is secured to the upper coil terminal 129 and the panel 23 by screws 133, threaded into the nut plate 134 which is further anchored in position to provide a secure attachment of the members by the screws 135, the heads of which are embedded in the recess 136 so that they may not interfere with the securement of the coil terminal 129 to the panel.

The upper part 138 of the arcing contact 123 is extended along the panel and forms a hook 139 for anchoring the arc chute in the manner hereinafter described.

The arcing contact 123 curves around the blow out coil as seen in Figures 3 and 4 and forms an arcing horn. The arcing contact is preferably wider than the coil 122 and as seen in Figures 3 and 4, its under surface rests against the edges of the insulating side plates 132. As has been above described, the arcing contact tip 121 is at the lower end of the arcing contact 123 and is preferably a contact surface of Elkonite silver.

As seen in Figures 2 (and 17), the contact shaft 45 is a square steel bar which as above described is covered with phenolic insulation molded in place. Each end of this shaft is drilled at 140a to receive the bearings 140. The shaft itself extends between the side plates 28 and 29. The bearings are brass cylinders inserted in holes in the side plates to which their drilled flanges 141 are secured by screws 142.

When the screws 142 are removed and the two bearings at each end are withdrawn, the shaft and the entire contact assembly may be removed from between the side plates provided of course that the flexible leads have been disconnected and also provided that the connection between the link 34 and the arm 35 of the contact shaft are separated.

*Assembly and operation of the contacts*

The contact arms 46 (see, for instance, Figure 3 and 17) are secured to the contact shaft by clamp members 51 which are held in place by a pair of screws 56 and 57 on each side of the shaft.

The outside poles are suitably positioned (Figure 17) by the contact arm caps or clamps 51a while the middle pole arm is held in position by the cap 51. As is seen more particularly in Figure 3 the clamp or cap 51 is extended to form the shaft actuating arm 35 and is drilled to receive pin 210 in the upper end of the main toggle link 34. A movement of the operating mechanism 31 will raise or lower the pin 210, therefore raising or lowering the shaft actuating arm 35 and so rotate the contact shaft 45 to move the contacts into and/or out of engagement.

As is more clearly seen in Figures 2 (and 17) secured to either or both ends of the steel contact shaft 45, is a steel arm 220 and 221. Each of these arms carries as will be noted, two studs 223 and 224 which are riveted in place.

Secured to one of the studs of each of the members 220 and 221 is a contact opening spring the lower end of which may be attached to studs riveted to the insides of the bracket side plates. These two springs may bias the shaft towards opening position and assure quick opening.

The second of the studs for instance stud 223 on the arm 220 may be utilized to operate auxiliary switches or other devices by means, for instance, the vertical insulated shaft 230 attached to this stud and passing through the shelf of the bracket 30 (Fig. 2).

Thus, for instance, the vertical shaft 230 may operate auxiliary switch 234 in any suitable manner for any suitable purpose. The rotation of the contact shaft 45 towards opening position will through the arm 220 and the stud 223 force the vertical line 230 downwardly. The vertical link 230 is connected by pin 231 to the crank 232 on the shaft 233 of the switch 234. The downward motion of the vertical link 230 will result in rotation of the crank 232 and will therefore result in rotation of the shaft 233 and in the consequent operation of the various contacts and other portions of the switch suitably connected to and actuated by shaft 233.

Such switch 234 may be used where, for instance, the circuit breaker is to be connected with automatic reclosing circuits when it is open and such relay will obviously be reset to its original position when the solenoid or manual closing mechanism hereinafter described rotates the contact shaft 45 towards closing position thus raising the insulated link 230 and operating the switch.

As has been above pointed out, preferably three contact arms 46 are mounted on this shaft, one for each pole of the circuit breaker as seen in Figure 2. On each side of each arm, there is cemented to the shaft insulation a bakelite washer 143 which improves the pole to pole and pole to ground insulation.

As will be noted in Figure 2, the inter-pole washers are bevelled and flanged so that the bevelled and flanged portions 144 thereof are spaced apart so that an inter-phase barrier 145 secured to the panel may extend between them. The cooperation of these parts makes it impossible for any flexible conductors of adjacent poles to be drawn together during heavy current flow while at the same time any possibility of arcing over is obviated.

In the construction and arrangement of the contacts, the movable main contact is supported by an operating arm on the contact bar or shaft and is connected to the lower stud by a flexible shunt of suitable size.

Pressure on the main contact is obtained through the use of a compression type coil spring, mounted outside the current path, and consequently, is unaffected by heating.

The pressure on the arcing contacts is also obtained by the same type of compression type coil spring protected from the arc.

The main contacts are protected by the sequence of operation in opening or closing of the device, since the main contacts close after the arcing contacts and open before them.

Although with the construction herein described, replacement of the contacts should not be necessary, the arrangement of the movable main contact lever and the movable arcing contact is such that access to both stationary and movable parts with a minimum amount of labor is possible.

As hereinafter described, accessibility of the main contacts is such that it is necessary only to remove one screw from the arc quencher assembly and lift it off manually so as to reach the contacts. In addition, as is hereinbefore described, the removal of the two bearings 140 of the main contact shaft and pigtails is sufficient to make available all parts of the contact mechanism for replacement, cleaning or repair.

The individual poles of the circuit breaker are each rigidly mounted on a rigid insulating shaft so as to insure the simultaneous opening and closing of all contacts. The use of a single trip free mechanism (in the manner hereinafter described,) operating the main contact shaft also insures that all of the poles will operate simultaneously and precludes the possibility of opening individual poles without opening others.

An important feature of the present invention is that the same structure may be used for single pole or multi-pole operation, that is, as seen for instance in the structure of Figure 2, the circuit breaker mechanism is so arranged that three poles are simultaneously operated by a single closing and tripping mechanism. The same type of structure may be so arranged as to take one, two or four poles or more.

In mass production manufacturing processes where tooling and dies and other operations should be so adjusted as to make it possible to obtain different types of products by the use of the same general operations, it is preferred that the standard tools and manufacturing processes be arranged to make circuit breakers having the maximum number of poles to be generally expected in a particular field. Although four poles or even more in certain special instances may be necessary, the usual maximum number of poles which may be required in ordinary installations is three.

Thus, in the ordinary process of manufacture, all of the elements may be made as shown in Figure 2 to accommodate three pole structures. Where the circuit breaker is to be used as a single pole circuit breaker, then it will be necessary merely to remove the two outer poles shown in Figure 2, leaving only the center pole. That is, the members removed from the circuit breaker (or not attached thereto during the process of manufacture) will comprise the left and right arc quenchers of Figure 2 and the left and right contact assemblies of Figure 2, leaving the center arc quencher and the center arc assembly in proper position for single pole operation.

Should a two pole circuit breaker be desired, the standard device may again be used with the center arc quencher and the center contact assembly removed. By this means, the whole development is constructed with full consideration for standardization and subsequent use in manufacture and delivery.

By this means also, all circuit breakers whether of the one or two or three pole variety may be standardized and the only change is the addition or removal of certain of the poles.

As is hereinafter described, the width of the panel below the contact shaft 45 has been reduced as far as possible so that should the three pole circuit breaker of Figure 2 be used as a single pole circuit breaker, then the only waste space is the marginal portions of the upper part of the panel 23 which is relatively no loss at all since in ordinary practice it is desirable that the mounting panel be rectangular.

The same consideration applies where the center pole assembly is removed and the circuit breaker is used as a two pole circuit breaker. The value and utility of these different variations will further be brought out in connection with the description of other members of the circuit breaker assembly.

*Arc chute, arch horns and blow out*

In the actual operation of the contact assemblies herein described, when the contacts are fully closed and the latches are then tripped, the contact shaft 45 and the contact arm 46 rotate in a counterclockwise direction in the views of Figures 3 and 4. As the arm and the contact pivot pins 76 and 63 move away from the stationary contacts, the springs 69 and 85 maintain the moving contacts in engagement with the stationary contacts until in the rotation of the contact levers these levers 75 and 60 strike their respective stops.

During this movement, the lower end 72 of the contact lever 60 strikes the part of the contact arm 46 which surrounds the shaft 45. At this point in the movement, the main contacts separate while the arcing contacts are still engaged. It is thus seen that the circuit through the main contacts is interrupted and all the current is transferred to the circuit of the blow out coil 122 and the arcing contacts. The core 130 therefore and its associated pole pieces are highly magnetized in proportion to the current flowing.

As seen in Figures 2, 3, 4 and 5 surrounding each pole is an arc chute 150 comprising side plates 151 of fiber and supporting between them five shorter parallel spaced plates 152 also of fiber. The entire group is held together preferably by rivets 153, 153 making as far as possible a rigid assembly. Preferably, the rivets comprise, as seen in Figure 5, a central metal tube-like arrangement 154 and an outer insulating cylinder 155.

As seen in Figures 3 and 4, near the panel 23, the inside plates 152 are separated by fiber members 156 which prevent the arc gases from coming in contact with the panel and which also comprise hooks 157 which engage under the hook or lip 139 of the stationary arcing contact member 123 in order to assist in supporting the arc quencher assembly. Near the front of the arc chute is secured a brass arcing horn 160 which is electrically connected to an angle-clip 161, being connected thereto by the screw 162 passing through the flange 163 of the arcing horn and a flange of the angle clip.

The metallic clip 161 is secured by the screw 164, and lock washer 165 to the bridge 37 of molded insulating material. This metallic clip 161 is electrically connected to the flexible conductor 100 which in turn connects it to the lower pig-tail terminal 44. At the end of the opening movement of the arcing contact the tip 87 of the movable arcing contact 75 moves under the stationary arcing horn 160 in the manner shown in Figure 4 so that the arc terminal is transferred to the stationary arcing horn 160 and the current flows through the conductor 100 to the lower terminal block 44. The current is first transferred from the main contacts to the arcing contacts, and, when are arc is then transferred to the stationary arcing contact or horn 160, the movable arcing contact is shunted out of the circuit.

As seen in Figure 2, the blow out core 130 extends beyond the sides of the blow out coil 122 a distance equal to the thickness of the fiber side plates 151.

The fiber side plates are notched at 175, as seen in Figure 1, so that they may embrace the core 130 while their edges rest against the panel 23. By this arrangement, any possible impediment to the magnetic fluxes induced by the core in the pole pieces hereinafter described is obviated.

Ferrous blow out plates or pole pieces 176, Figures 1, 2 and 5, are secured to the outer surfaces of the side plates 151 of the arc chute by means of rivets or other suitable attaching means 177. These blow out plates or pole pieces, as seen particularly in Figure 1, cover a part of the notch 175 in the fiber plates 151 so that when the arc chutes are in position against the panel 23 and in proper relation to the contact assembly, the surface of each end of the core 130 is in contact with a corresponding iron blow out plate or pole piece 176.

Each of the side plates has its back edge 180 (Figure 1) bevelled on the inner side thereof so that it may be slid in position easily past the notches of the insulated bridge hereinafter described.

The notch 175 around the blow out core 130 (Figure 1) and the lip 139 on the stationary arcing contact 123 which engages the hook 157 of the fiber spacer 156 of the arc chute 150 (Figure 3) cooperate to position the back end of the arc chute in exact relation to the panel 23 and to the various other portions of the contact assembly.

The front end is supported and locked in place by means of the screw 164 passing through the insulating bridge 37 and through the angle clip 161 which in turn is affixed by means of the screw 162 to the stationary arcing horn 150 which in turn is preferably an integral part of or securely attached to the arcing chute 150.

The front end of the arc chute is therefore securely positioned in place by means of the screws 164 and 162. It will be noted that removal of the screw 162 will permit the withdrawal of the entire arc chute from the contact assembly. That is, when the screw 162 is no longer in engagement with the angle clip 161 then (Figure 3) when the entire arc chute 150 is slid towards the left, the hook 157 of the fiber spacer 156 may be disengaged by this simple horizontal movement from the hook 139 of the arcing contact 123 and as seen in Figure 1, the notch 175 of the outer plate 151 may by the same motion slide out of engagement with the blow out core 130. The arc chute therefore is so arranged that a simple unscrewing of the screw 162 will permit removal thereof.

It should be noted that the screw 162 is so arranged that it need not be completely removed but it may be rotated a sufficient number of turns to disengage it from the clip 161 and may remain in the portion 163 of the arcing horn 160 during removal of the arc chute. By this simplified means involving rotation of a single screw, the arc chute may be securely mounted in place or quickly removed by a single motion in a horizontal direction.

The arc splitting plates 152a (five in number in the preferred embodiment) have, as seen in Figures 3 and 4, their lower edges shaped in two arcs 190 and 191 which are concave in a downward direction with the cusp 192 between them rounded. This cusp lies approximately midway between the stationary arcing horn 123 and the front arcing horn 160. The downwardly extending cusps facilitate the entrance of the arc into the slots between the plates and are so arranged that a relatively small longitudinal length of the arc is first forced between the plates and so that as the arc is blown upwardly, progressively greater lengths of the arc are forced between the plates.

As is also seen in Figures 3, 4, and 5, the lower edges of the plates 152 are of different heights, the middle one 152a being the highest and the outer plates 152c being the lowest, that is, extending downwardly a greater distance. The intermediate plates 152b are of a height so that the lower edges extend in planes substantially between the position of the edges of the middle and outer members.

As is also seen in Figures 3 and 4, the five plates here shown have perforations 195 of suitable size and shape, spaced and arranged to permit the flow of arc gases from the slot 196 (Figure 5) between one pair of plates to the slot between another. In order to provide a more turbulent condition of the arc gases and in order to insure contact of the arc gases with the various plates, the holes or perforations 195 of each of the plates are in staggered relation with respect to those in adjacent plates.

Upon opening of the main contacts and formation of the arc between the arcing contacts 74 and 123, the arc is immediately transferred from the arcing tip 74 to the arcing horn 160.

The current flowing through the coil 122 energizes the magnet comprising core 130 and ferrous plates 176 producing a flux across the arc space. This flux forces the arc upwards towards and into the arc chute 150. When the arc reaches the lower edges of the arc splitters of plates 152 it is squeezed or flattened to be forced between the two outer plates 152c and 152c. Further movement forces the arc between the intermediate plates 152b—152b further reducing its horizontal width.

As the arc is pushed further it may enter one of the slots 196 or it may be divided longitudinally in two or more slots. In either case, the arc gases have an opportunity to expand through the holes 195 in the plates 152.

This provision for permitting the arc gases to expand from slot to slot reduces the back pressure and hence permits the blow out magnet to force the arc upward at full speed.

The tendency of the ionized gases discharged from one slot to enter another through the perforations 195 permits parallel arcs to exist over sections of the arc. This causes greater instability and increased tendency to speed the extinguishing of the arc.

By this means also a large cooling area is provided which further contributes to shorten the arcing time. Preferably the arc gases are sufficiently cooled and deionized by the arc quencher so that when, in the case of alternating current, the current passes through zero in the cycle immediately following the formation of the arc, the gases will be sufficiently deionized to provide an extremely difficult path for an arc and thus prevent the re-striking thereof. The arc therefore may be quenched within $1/120$ of a second of the formation thereof.

Inter-phase barriers

Sufficient inter-phase barriers are provided by the side plate 151 of the arc chute. However, additional inter-phase barrier plates 145 (Figures 1–4, inclusive) may be used to make it impossible for any flashing over of the arc from one pole to the other. These inter-phase barriers are placed between the arc chutes and carried up so that they are aligned with the top of the panel 23 and may be secured to the panel by suitable angle clips 200, Figure 2, and screws 201 passing therethrough.

As will also be seen in Figure 1, the inter-phase barrier 145 extends beyond the arc chute both at the top and the front. The front lower corner rests on the insulation bridge 37 while as has been before pointed out, the back end bears against the panel and extends down between the shaft insulation disks 143—143.

Lower interphase barriers 100a (Figure 1) are aligned with the upper interphase barriers and secured to the panel 23 by screws 101a and 102a thus preventing any tendency of the flexible leads to approach each other or any current at that point from arching over.

The lower back corner of the upper interphase barrier is supported by a strip of insulating material secured to the panel just above the top of the housing brackets. The lower interphase barriers align with the upper ones and are secured to the panel by screws threaded into their edge. These lower barriers are notched to surround the shaft. They prevent the flexible conductors from being drawn together during fault current.

Operating mechanism (closing and tripping)

An extremely important element of the present invention and of the combination herein set forth is the operating and tripping mechanism 31 (Figures 1, 3 and 4). The elements of this operating and tripping mechanism are more clearly set forth in Figures 6 through 16, inclusive. The entire mechanism 31 itself, however, is contained within the housing 300 (Figure 3) which is a steel box closed on the front, bottom and sides with flanges 32 at the upper edges of the sides so that it may be secured by the bolts 33 to the shelf 30 of the housing bracket assembly. The side walls of the housing 300 are pierced for the main stationary pins of the mechanism and the metal around the holes is extruded inwardly and reamed to obtain proper bearing for the pins.

Referring now more specifically to Figures 9 and 10, 13 and 14, the link 34 in each of these figures is the member which engages the actuating arm 35 of the contact shaft 45.

Figure 9 shows the position of each of the members of the operating and tripping mechanism when the circuit breaker is opened. Figures 10 and 13 show the position of each of the members when the contacts of the circuit breaker are closed. Figure 14 shows an intermediate momentary position of each of the members at the completion of the tripping operation, and an instant before re-set of the latches.

In the following description of the details of operation, references should be made as to each member to the drawings of Figures 9, 10, 13, and 14, while also the top view of Figure 6 and the horizontal cross sectional view of Figure 7 will aid in the understanding of the various operations.

In further aid of the following description, the diagrams of Figures 22 to 25 should be referred to. Figure 22 shows the closed position corresponding to Figures 10 and 13; Figure 24 shows the open position corresponding to Figure 9; Figure 23 shows the position at tripping and immediately before latch re-setting, corresponding to Figure 14; and Figure 25 is a diagrammatic illustration of the trip-free position in the case of operation of the latches while the manual or solenoid closing member is in engagement.

The operating mechanism comprises a plurality of toggles so arranged that the knee pins or knuckle pins of each may be supported when the contacts are closed; but wherein the supports may be removed, permitting the contacts to open when the tripping operation is effected.

One of the toggles comprises an operating link 400 preferably, and for structural reasons, formed from two side plates 401 and 402, and a tie plate 403 extending between them for rigidifying purposes. The operating link 400 is rotatably mounted on the fixed pivot 404 which is rotatably carried in the perforations of the metal side walls of the outer casing.

The operating link 400 carries rotatably mounted therein between the side plates 401 and 402, the knee or knuckle pin 405.

Link 406 comprising also a pair of side plates 407 and 408 and a tie plate 409 for rigidifying purposes is rotatably mounted at one end thereof on the knee or knuckle pin 405.

The link 406 carries at the opposite end thereof the pin 410 which is rotatably mounted therein between the side plates 407—408 thereof. Pin 410 carries rotatably mounted thereon a lug 411 providing a means for securing one end of the tension spring 412 thereto. The opposite end of tension spring 412 is secured to a lug 413 which is rotatably mounted on a rivet head 414 which is carried by the upstanding lug 415 of the side plate 401 of the link 400.

The effect of the tension exerted by spring 412 between the points 414 and 410 is to collapse the toggle comprising links 400 and 406 to the position shown in Figure 9.

A third link 416 comprising a pair of independent side plates is rotatably mounted at one end thereof on the pin 410. The opposite end of the link 416 is rotatably connected to the pin 417 which is carried by the latch lever 418.

The latch lever comprises a pair of side plates 419 and 420 with a tie plate 421 therebetween. One end of the latch lever is rotatably mounted on the fixed pin 422 so that it is free to rotate thereon.

Pin 410 also rotatably supports one end of the connecting link 34, which extends between the operating mechanism and the actuating arm of the contact shaft. This link is a single wide member of phenolic insulation.

An abutment 425 is also rotatably mounted on the stationary pin 422. The abutment or main latch 425 comprises a V-shaped member having a center portion 426 which is pivotally mounted on the pin 422, an abutting or latching portion 427 adapted to engage a roller on the pin 405 in the manner hereinafter described, and a release portion 428.

The upper edge of release portion 428 is adapted to lie in engagement with the under side of tie plate 421 of the latch lever 418, so that any movement downward of the latch lever 418 will result in a clockwise rotation of the said portion 428 of the abutment 425 and will result in moving the abutting or latching portion 427 thereof out of engaging position.

A spring 440 is so arranged as to tend to yieldingly support the abutment member 425 so that the latching portion thereof 427 may always be in position to engage the roller 405.

Pressure of release portion 428 against the plate 421 of the latch lever limits the effect of the spring 440 and serves positively to position latching portion 427 in predetermined position.

When the link 400 is raised and the knee pin 405 of the toggle formed by the links 400—406 is therefore raised then since the link 416 (by means of its attachment between pins 410 and 417) prevents pin 410 from approaching closer to the pin 414, the only direction in which the link 406 may rotate by reason of the elevation of the pin 405 is in such a direction that the pin 410 moves counterclockwise with respect to pin 405.

In this manner, raising of the link 400 in any suitable manner results in an extension of the tension spring 412 (the members then assuming the position shown in Figs. 9 and 13) and in an increase of force tending to draw the pins 410 and 414 together, creating a tendency to collapse the toggle formed by links 406 and 400.

The members are arranged so that when the toggle formed by links 400—406 about pin 405 is in such position that the contacts of the circuit breaker are closed (as for instance in Figure 10), the toggle is just under center, that is the center of pin 405 does not reach a straight (imaginary) line drawn between the axes of the pins 404 and 410 and does not pass through such line.

In this way, this toggle is unstable even when set in the closed circuit position. When therefore, the supporting means herein described is removed from the toggle it will immediately collapse owing to the tendency of the tension spring 412 to draw the pins 410 and 414 together.

In the open circuit position and even in the closed circuit position, the pin 417 is a stationary one in that it is mounted on the latch lever 418 one end of which is fixed by its mounting on the pin 422 and the other end of which is fixed by the engagement of the latching tip 430 with the notch 431 of the primary latch 432.

Therefore during the closing operation the lower center of rotation of the link 416 is fixed and for this reason also the pin 410 is to some extent supported by the link 416.

This partial support of the pin 410 by the link 416 results in downward pressure upon the latch lever 418 in closed circuit position of Figures 10 and 13 thus resulting in pressure of the latch lever trip 430 upon the base 433 of the notch 431.

As the operating link 400 of the toggle 400—406 is raised, the roller 405 of the toggle comes in contact with the surface 434 of the abutment 425 and moves the same in a clockwise direction (with respect to Figures 9 and 10) out of the way so that the knee pin 405 may rise. After this pin has passed the area 434 of the abutment 425 then the spring 440 of the abutment pushes the abutment 425 in a counterclockwise direction (with respect to Figures 9 and 10) so that the member 428 of the abutment abuts against the tie plate 421 of the latch lever 418 and so that the abutting portion 427 is swung beneath the knee pin 405 of the toggle 400—406 (in the position shown in Figures 10 and 13) to support the same against the tendency of the tension spring 412 to pull the pins 414 and 410 together and thus collapse the toggle by driving down the knee pin 405.

Should the abutting or latching portion 427 of the abutment 425 be again rotated (clockwise with respect to Figure 10, or counterclockwise with respect to Figure 13) out of engagement with the pin 405, then the tension spring 412 will operate in a manner hereinbefore described to collapse the toggle 400—406 and move the elements back again to the position shown in Figure 9.

The means by which this is accomplished includes the primary latch 432 and the secondary milled latch 450.

As above noted, when (Fig. 10) the toggle 400—406 is in the position for the closed contacts, the knee pin thereof has not passed through center. Likewise, the links 34 and 416 are in such relation to each other that the pin 410 which constitutes a knee pin therebetween has also not passed through center. Consequently, owing to this instability any element which will cause any one of the toggles to collapse will cause all to collapse towards their original position as shown in Figure 9.

The knee pins of the toggle mechanisms are each supported in the closed circuit position; the knee pin 405 of the toggle 400—406 being supported by the abutment 425; and the knee pin 410 of the toggle 34—416 being supported in part by the stabilized position of the knee pin 405 and in part the stabilized position of the pin 417.

When support is removed from the latch lever 418 and it is allowed to drop under the substantially vertical downward pressure exerted thereon through the link 416 when in closed circuit position (Fig. 14), then as the tip 430 thereof drops, the tie plate 421 comes in contact with the portion 428 of the abutment 425 and causes the same to rotate (in a clockwise direction with respect to Figure 10) (or counterclockwise with respect to Figure 14) about the pin 422 thus removing the latch portion 427 of the abutment 425 from beneath the pin 405 and thus permitting the toggle 400—406 to collapse under influence of spring 412 to the position shown in Figure 9.

Collapse of this toggle also collapses the toggle 34—416 by causing the knee pin 410 thereof to be drawn by tension spring 412 towards the position shown in Figure 9.

As the link 416 is moved from the position shown in Figure 10 to the position shown in Figure 9 (and through the stage of Figure 14), the contacts open and the pin 410 reaches the limit of its downward movement. Thereafter the link 416 exerts a slightly upward pull owing to the pull upon the pin 410 by the tension spring 412. This upward pull now exerted by the link 416 upon the latch lever 418 results in a rise once more of the latch lever and thus permits the spring 440 of the abutment to swing the abutment back to the original position as is again seen in Figure 9.

By reason of the fact therefore that a single element to wit the link 416 exerts a substantially downward vertical pressure upon the latch lever in the closed circuit position, and further by reason of the fact that after completion of the rapid opening movement, this downward pressure exerted by the link 416 is reversed and becomes an upward pull, latches may be designed to cooperate with the latch lever in such a manner as to selectively resist the downward force until they are released and to become automatically reset by reason of the upward movement.

Accordingly, we have here designed a combination of a primary 432 and a secondary latch 450 for accomplishing this important object.

By the means herein described, as the various links and members of the operating mechanism pass from the closed circuit to the open circuit position, the latches which have been tripped for the purpose of initiating this movement will automatically reset immediately after the end of the tripping operation so that the only operation required to again close the circuit breaker and hold it closed is a raising of the link 400 or in other words, a rotation of the link 400 counterclockwise (with respect to Figures 9 and 10) about the stationary pin 404.

The primary latch comprises a curved link 432 which is pivotally mounted on the stationary pin 460 and rotatable thereon. The member 432 has a front cam surface 461, the notch 431 hereinbefore described and the latch lever abutment 433 as well as the resetting toe 462. The primary latch 432 is restrained in latching position by the milled latch 450 hereinafter described that is, it is restrained against counterclockwise rotation (with respect to Figure 10).

Now, when the restraint against counterclockwise rotation of the primary latch 432 about its pin 460 is removed, then pressure of the tip 430 of the latch lever 418 upon the abutting portion 433 of the notch 431 of the primary latch 432 causes the latter to rotate about its pin 460 thus releasing the latch lever 418 and allowing the pressure thereon induced through the link 416 to cause it to drop.

This dropping or forcing down of the latch lever 416 swings the abutment 425 out of abutting position in the manner hereinbefore described, thus removing any support from the toggle mechanism 400—406, and thus permitting the pin 405 to drop because of the tension of the spring 412 which draws the pins 414 and 410 together.

The position as the dropping motion of the latch lever is completed is shown in the schematic perspective view of Figure 14 out of Figure 23. This position occupies the briefest possible instant of time during the tripping operation and is but one stage of a single continuous movement.

As the link 416 is swung about its pivot 417 on the latch lever 418, by reason of the drawing together of the pins 410 and 414 the contacts are opened and the limit of downward movement is reached. Then what previously has been pressure exerted through the link 416 becomes a pull thereon by reason of the pull of the spring 412. By reason of the mounting of the latch lever 418 upon the stationary pin 422, this pull on the link 416 and the pin 417 carried by the latch lever, now results in a rotation (counterclockwise with respect to Figure 10 and clockwise with respect to Figure 14) of the latch lever 418 thus raising the latch lever once more towards the position shown in Figure 9.

As the latch lever is thus pulled up, the pressure thereof against the cam surface 461 of the primary latch 432 prevents the resetting of this primary latch or the replacement thereof in its original position until the latch tip 430 of the latch lever 413 strikes the projecting toe 462 of the primary latch 432. The pressure of the upward movement of the latching tip 430 beneath the projecting toe 462 now causes a rotation of the primary latch 432 (clockwise with respect to Figure 10 and counterclockwise with respect to Figure 14) towards the resetting direction and towards the position, therefore, of Figure 9 so that the latch tip 430 enters the notch 431 and lies between the toe 462 and the abutment 433 of the notch 431 in preparation for any subsequent closing operation or tripping operation which may be required of the circuit breaker.

An abutment 502a is placed on the bottom wall of the housing to limit the rotation of the primary latch when the toe thereof is struck by the latch lever. The abutment 502 of the primary latch (which limits motion in the tripping direction in the manner hereinafter described) also limits the rotation of the primary latch during resetting by striking against abutment 502a when the toe 462 is raised by the tip of the latch lever.

It will thus be seen that immediately after the tripping of the primary latch 432 by reason of the removal of the restraining movement hereinafter described, the primary latch 432 is not permitted to rotate to its original position until the latch tip 430 of the latching lever 418 has actually entered the notch 431. This is by reason of the fact that the latch tip 430 operates against the cam surface 461 of the primary latch. But when the latch tip strikes the toe 462 of the primary latch then the very motion by which it enters the notch 431 causes it to rotate the primary latch to its original position and thus causes the restraining influence thereon to be reset.

The restraining influence heretofore referred to is, of course, the milled latch 450 and it should be understood that the milled latch 450 when tripped can therefore not return to its original latching position until after the primary latch 432 has been reset in ts position.

As seen in the diagrammatic view of Figure 25, the mechanism is also trip-free, that is, disengagement of the latches will permit opening of the contacts even though the actuating members are engaged either by the solenoid or manually.

The milled latch 450 is actually a shaft 500 (see Figures 6, 13 and 14) having a portion 450 milled out, the milling being of a sufficient depth to permit the base or latch engaging portion 501 of the primary latch 432 to pass therethrough when the shaft 500 is rotated in the proper direction.

An abutment 502 of the bottom of the primary latch 432 lies adjacent the base or latching tip 501 of the primary latch 432 to limit the movement of the base of the primary latch into the milled 450 in the manner shown in Figure 14. The milled latch 450 and its shaft 500 is normally retained and biased towards the latching position of Figures 9, 10 and 13 by spring 505.

The shaft 500 is rotatably mounted in suitable bearings 503, 503 (cf. also Fig. 6) and carries arms 504, 504 and 504' preferably of insulating material keyed thereto or molded thereon. The spring 505 which maintains the milled latch in suitable latching position is connected to a stud 506. Shaft 500 is tapped and drilled at 507 to receive the stud 506. The opposite end of this tension spring is passed through and thereby attached to an eye in the lug 508 screwed into a drilled and tapped hole in the side wall of the housing.

Arm 509, Figure 9, forming preferably an integral part of the insulating arm 504' abuts against the set screw 510 which may be set and locked by means of locking nut 511 in the downwardly depending flange 512 of the rear of the housing. This serves to limit the motion of the shaft 500 carrying the milled portion 450 so that it may rotate in response to the tension of spring 505 only enough to permit latching and so that it may not rotate clockwise (with respect to Figure 9) any further distance than that shown.

This milled latch 450 is thus of that variety generally known as a "dead center" latch wherein the force exerted by the latching tip 501 of the primary latch 432 does not tend to induce any movement of the latch 450 but is substantially directed towards the center thereof inducing a condition of stability.

When the shaft 500 is rotated counterclockwise (with respect to Figures 9 and 10) then it need not overcome any substantial force tending to impede its rotation, since the only impedance to such rotation is first the spring 505 which is merely sufficient to maintain the latch in locking position and the slight friction between the latching tip 501 of the primary latch and the side of the shaft 500.

Since this friction is exerted only slightly tangentially and hence does not tend substantially to impede rotation of the shaft 100, it is negligible, and any tripping action manually induced or automatically induced need merely be of sufficient movement to rotate the shaft 500 counterclockwise (with reference to Figures 9 and 10) in order to trip the entire mechanism.

*Automatic tripping*

This tripping action may be a result of the over current coil 110 (Figure 3) or of a movement of the manual arm 520 in the manner herein described. The over current coil 110 may, in a manner which is now well known in the art, actuate a tripping arm 521 (Figures 9 and 10) which may be attached in any suitable manner to a movable armature 110a of the over current coil.

As seen in Figure 1, the overcurrent coil 110 comprises a plurality of turns preferably of bar copper, the said coil being suitably connected in series between the lower connection stud 111 and the pigtail terminal post 44.

The action of the over current coil is designed so that it is one tending to cause the tripping arm 521 to rise and strike the lever 504' keyed to the shaft 500 carrying the milled portion 450. This results in rotation of the shaft 500 of sufficient extent as shown in Figures 13 and 14 to cause the milled portion 450 to rotate so that its edge is below the latch tip 501 of the primary latch 432.

Whereupon the downward pressure of the tip 430 of the latch lever 418 in the manner hereinbefore described causes the primary latch 432 to rotate about its mounting 460 so that the latch tip 501 enters the milled portion 450 a sufficient distance to permit the latch lever 418 to drop in the manner shown in Figure 14 thus moving the abutment 425 in the manner hereinbefore described to permit the toggles to collapse under the influence of the spring 412 and to therefore permit the tripping and latch resetting operations hereinbefore described.

When the contacts are opened by means of the tripping operation, then the over current coil 110 is no longer energized, the tripping arm 521 associated with the over current coil 110 is no longer in its tripping position, the rise of the latch lever 418 to re-engaging position then forces the primary latch back to its original position and when the latch tip 501 of the primary latch 432 is no longer within the milled slot 450 of the shaft 500 then the spring 505 returns the shaft 500 to its original position and the entire mechanism has then passed from the closed stage shown in Figure 10 through the tripping stage shown in Figure 14 into the contact-open stage shown in Figure 9.

Solenoid closing

When the circuit breaker is in the open circuit position so that the toggle mechanisms thereof are in the position shown in Figure 9, then the closing operation may be effected by means of the closing solenoid 530 and its moving armature 531 (Figs. 1, 9 and 10). When the circuit is closed to the closing solenoid 530, in any suitable manner, then the closing armature 531 thereof (see Figure 3) will be raised.

When the closing coil 530 is energized and the armature 531 thereof is raised, then the shaft 532, Figure 3, thereof is raised from the position shown in Figure 9 to the position shown in Figure 10.

The shaft 532 is, as shown in Figure 9, immediately beneath the knee pin 405 of the toggle 400—406. The raising of the shaft 532 by the energization of the closing solenoid causes a raising of the knee pin 405 of this toggle by engagement of the end of the shaft with a roller of the pin 405 as shown in Figure 10 until the knee pin roller pushes past the abutment 425 and then rests upon and is retained by the abutting portion 427 of the abutment 425.

Preferably, the closing coil is thereafter deenergized so as to allow armature 531 to return to lower position so that shaft 532 does not impede the dropping of the knee pin 405 to the position shown in Figure 9 should a tripping operation occur.

The opening of the contacts, due to automatic tripping, is assured and rapid whether or not the solenoid is deenergized when a fault occurs. The resetting of the latches, however, cannot be completed until the falling of the plunger permits the spring 412, to force the pin down to its lower position.

The armature 531 of the solenoid and the housing thereof (cf. Figure 1) is so arranged that when forced downwardly the bottom of the armature will strike the steel pin 531a. This pin is supported only at the ends and is sufficiently elastic to provide an adequate shock absorber when violently contacted by the bottom end of the armature.

Manual closing

In the present invention, we contemplate also the utilization of a manual means for closing the circuit breaker, said manual means being operative to supplement the solenoid closing operation, both mechanisms being mountable in connection with the same circuit breaker and providing a selective manual or solenoid closing operation.

The manual operating lever 520 is keyed to the square shaft 550 by means of the screw 551. The square shaft 550 is inserted in the squared hollow portion of the cylindrical casting 552 and secured therein if desired by the screw 552a which may be inserted in the casting, access being obtained through the opening 552b in the bottom of the housing. The shaft 550 may be of any suitable length depending on whether or not a cover or casing is used for the circuit-breaker and may, with its handle, be rapidly interchanged, or it may be a removable shaft for use with many circuit-breakers. The cylindrical casting 552 carries thereon a helical cam 553. The operating arm 400 carries on a downwardly extending portion 554 thereof a roller 555 (see Figures 9, 10, 12 and 15).

The cylindrical casting 552, has a square hole broached through it. In the back part of this hole, there is secured a short square shaft by means of a set screw. The extreme back end of this shaft is turned round and bears in a hole in the arm bent up from the floor of the enclosure. This forms the back bearing for the casting.

Mounted on the square of this shaft between the bearing and the casting is the hand trip lever, 800. The front end of the casting is turned down to bear in a hole in the front plate. The handle shaft, 550, is a removable unit, so that it can be replaced by a different unit suitable for other types of control. These control shafts are held in the casting by a set screw.

A manual rotation of the lever 520 in a clockwise direction (with respect to Figures 2, 8 and 12) will result in a closing of the contacts. The helical cam 553 will raise the roller 555, thus raising the link 400 (cf. Fig. 11) the raising of the link 400 closing the contacts in the manner hereinbefore described.

Manual tripping

The manual lever 520 and the shaft 550 to which it is keyed also provides for a manual tripping where that is desired in addition to the automatic trip by means of the over current coil 110.

As is seen in Figure 11, the shaft 550 carries an arm 560 secured thereto. This arm 560 may cooperate with the bent-over flange 561 (Figures 8, 11, 15, 16 and also Figures 9 and 10) of trip lever 562 to provide a manual tripping of the circuit breaker. The trip lever 562 is rotatably mounted on the pin 563 and is restrained in the position shown in Figures 9, 10, and 15, by the coil spring 564, one end of which presses against the floor of the housing and the other end of which is bent-over at 565 to engage the trip lever beyond its fulcrum 563.

The trip lever 562 is provided with an abutment 566 which rests against the floor of the housing to provide a stop therefor. The trip lever has at the opposite end from the flange 561 a rounded portion 567 which may register with the arm 568 attached to the shaft 500. Any rotation of the trip lever 562 in a clockwise direction (with respect to Figures 9 and 10) will result in the forcing of the end 567 down onto the lever 568 thus causing a rotating of the shaft 500 against the influence of the spring 505 and thus rotating the milled portion 450 thereof to the tripping position shown in Figures 14 and 16.

The manual lever 520 when it is therefore rotated in a counterclockwise direction (with respect to Figures 2, 8 and 11) causes the arm 560 attached to the shaft 550 to bear against the flange 561 of the trip lever 562 and by raising that end of the trip lever 562 depresses the end 567 of the trip lever, thus rotating the shaft 500, bringing the milled latch portion 450 thereof into registry with the latching tip 501 of the primary latch 432 and permitting the tripping open of the circuit breaker in the manner described in connection with Figure 14 and as shown in Figure 16.

As is seen in Figure 2, the escutcheon plate 600 at the front of the circuit breaker may be suitably marked with the words "Close" and "Trip" to indicate the direction in which the manual lever 520 should be rotated in order to obtain the desired action.

Safety lock

This cooperation between the manual lever 520 and the arm 560 on the shaft 550 thereof with the flange 561 of the latch lever 562 may be utilized for the purpose of locking the circuit breaker in open position to prevent unauthorized closing thereof.

Figure 6:
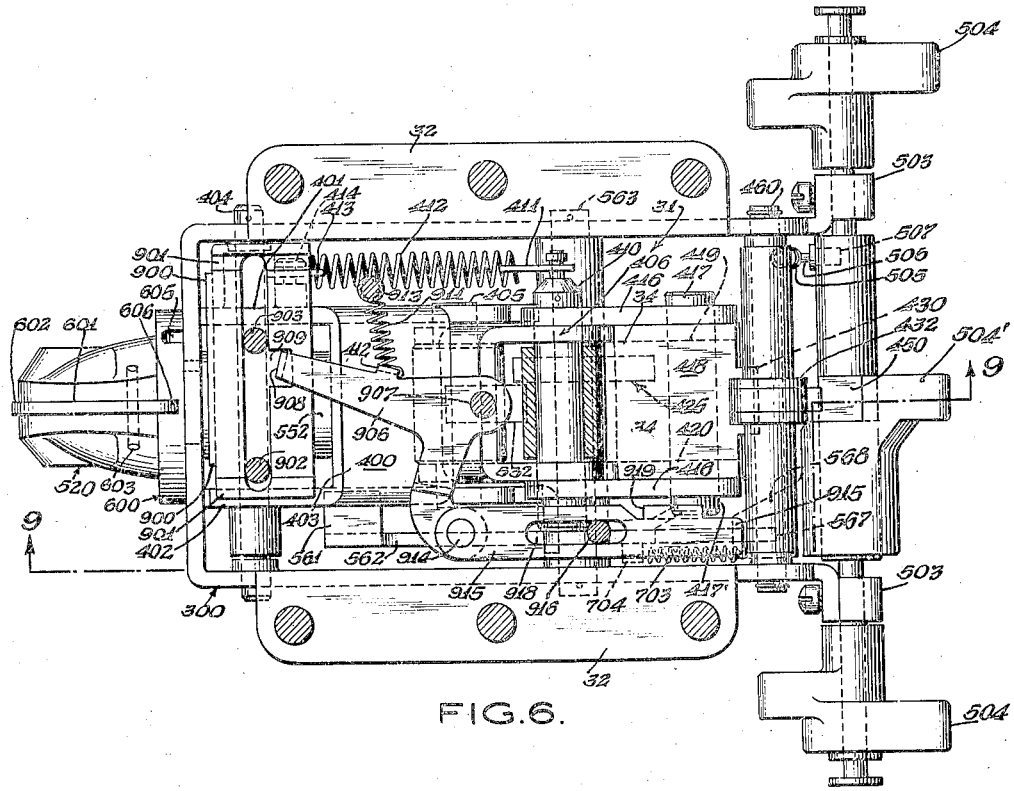
Figure 6 is a top view taken on line 6—6 of Figure 4 of the toggle mechanism for closing and opening the circuit breaker.
Figure 7:
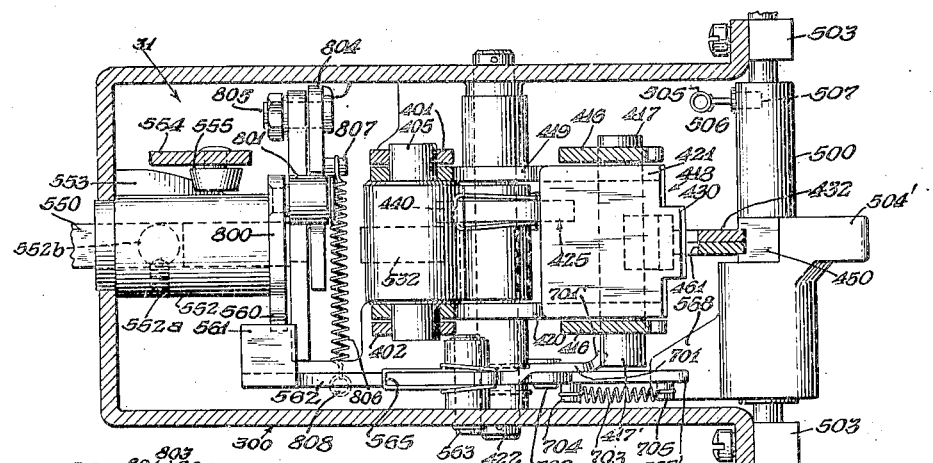
Figure 7 is a horizontal cross sectional view taken on line 7—7 of Figure 10 showing the arrangement of the parts of the members of Figure 6 at a different horizontal level within the toggle mechanism container.

As seen in Figures 1, 9, and 6, the top of the manual handle or lever 520 may be slotted at 601 to receive a locking bar 602 pivotally mounted upon the pin 603. A suitable spring may, if desired (although it is not essential), be arranged to bias this locking bar 602 so that the locking tip thereof 606 may be pressed against the circular portion 604 of the escutcheon plate 600. The circular portion 604 may have a notch or slot therein 605 as seen in Figure 6.

Rotation of the lever 520 in a counterclockwise direction (with respect to Figure 2) will cause the locking bar 602 to be rotated to such a position that the locking tip 606 may be forced into the notch or cut-out 605.

The rotation in this direction will also result in the tripping action by means of the trip lever 562. Should the manual lever 520 now be left in position where the tip 606 of the lock bar 602 is engaged in the notch 605, then the end 567 of the latch lever 562 will continue to be firmly pressed against the lever 568 and, as shown in Figure 16, will cause the latch 450 to be continuously in tripped position.

When the manual lever 520 is left in such a position that the arm 560 thereof continuously presses up the flange 561, then it will be impossible either manually or electrically to close the contacts.

The locking bar 602 has a slot 608 therein (Fig. 2) which is so arranged that when the locking tip 606 is depressed into the notch 605, the slot 608 comes into view. This slot is of sufficient width to permit the passing of the hasp of a padlock therethrough to prevent the depressing of that end of the locking bar and the raising of the locking tip 606 out of the notch 605. In this way, it becomes impossible for an unauthorized person not provided with a key to the particular lock to rotate the manual lever 520 to such position as will permit return of the milled latch 450 to its engaging position. This, of course, adds another extremely important safety factor in the use and operation of our circuit breaker.

Back up trip

In the operation of circuit breakers, and circuit closing mechanism, it is sometimes found that careless operators, when the circuit breaker has once been tripped, attempt to close the circuit breaker by only a partial closing operation. In order to prevent an operator from moving the contacts so that they just touch and open again, as is sometimes done to "inch" a motor, we therefore provide a back-up trip so arranged that any reversal of motion in the closing of the circuit breaker will result in a tripping open thereof and so that any attempt to move the contacts to such position that they just touch and no more will result in the tripping open of the circuit breaker.

This device (see more particularly Figures 15 and 16) consists of a set of ratchet teeth 700 mounted on one end of the link 400 and engageable by a pawl 701 pivotally mounted at 702 on the trip lever 562, and urged into engaging position by the tension spring 703 connected to the pin 704 attached to the pawl 701 and connected at the opposite end to the pin 705 on the trip lever 562.

The pin 704 rides in the slot 706 of the trip lever 562 which limits the motion of the pawl 701. During the upward movement of the closing lever 400, the tripping pawl is biased into engagement with the ratchet teeth and the ratchet teeth are so arranged that during this upward movement, they slide past the engaging portion 707 of the pawl 701. The lower surfaces of the ratchet 700 are so arranged, however, that any downward motion thereof will cause a depression of the pawl 701. During the closing operation, should the lever 400 reverse its movement, the downward movement of this lever will force the ratchet teeth 700 to press the pawl 701 downwardly (cf. Figure 16), thus pressing down the end 567 of the trip lever 562 by reason of the fact that the pawl is mounted on that side of the fulcrum 563, thus pressing the tripping end 567 of the trip lever against the lever 568, rotating the shaft 500 and causing the milled latch 450 to be rotated to tripped position.

In the closing operation, as the toggle pin 560 approaches the center line (in which the arms 400—406 tend to approach a straight line position) the movement of the pin 405 becomes relatively large as compared with that of the contact arm 46. It is, therefore, possible to allow the teeth then to move away from the pawl before the lever movement is completed, as seen in Figures 10 and 15.

During the closing movement and before this tripping action has occurred, the pawl 701 is in engagement with the ratchet teeth 700 to cause any even slight reverse movement to effect the ripping action of the trip lever 562. During the tripping operation, however, it is desirable to move the pawl 701 to such a position that it will not engage the ratchet teeth 700 so as not to impede the dropping of the link 400 and its associated pin.

Likewise, when upon the occurrence of a reverse movement during the closing operation, the ratchet teeth engage the pawl 701 to depress the trip lever and hence cause an automatic tripping in the manner above described; it must also be possible during the remainder of the tripping operation initiated by the reverse movement to move the pawl out of the way of the ratchet teeth.

Accordingly, the pawl 701 is provided at the bottom thereof with an inwardly bent flange 701'. This flange is arranged to coact with a roller mounted upon a pin 417' of the latch lever 418.

When a tripping of the circuit breaker occurs either by reason of a manual trip, the occurrence of an overload or by reason of a reversal of movement during closing, the latch lever will drop in the manner hereinbefore described. As the latch lever drops, the pin 417' above mentioned thereon, comes into contact with the flange 701' of the pawl 701 and the downward pressure of the pin upon this flange causes the pawl to rotate upon its mounting so that the engagement portion thereof swings away from the path of the ratchet teeth and permits the link 400 and its associated pin to descend without any impediment whatever.

Thus, upon the occurrence of a reversal of movement the pawl 701 is engaged with the ratchet teeth 700 only for a sufficient length of time to cause a depression of the trip lever for the tripping purposes hereinbefore described, and upon the dropping of the latch lever in response to this action, the pawl is, in the manner above described, disengaged from the ratchet teeth.

In spite of the fact that a reversal of movement during the closing operation thus results in a tripping of the circuit breaker, the circuit breaker nevertheless is trip free in the manner shown in Figure 25 so that even though the link 400 is held in raised position either by the manual closing lever or by the solenoid closing armature, the latch lever may drop in response to an overload and thus permit the opening of the contact.

Handle reset

As is more clearly seen in Figures 8, 11, 15 and 16 the manual operating lever 520 may be arranged so that it will automatically return to neutral position immediately after either a tripping or closing operation has been effected therewith, that is immediately after any manual pressure has been removed therefrom. This means for returning the manual lever to neutral position comprises an arm 800 mounted on the shaft 550 and which may preferably and for purposes of economy be an extension of and formed integrally with the tripping arm 560. The arm 800 is provided with a roller 801 mounted on a stud 802. The rotatable bearing when the shaft and the manual operating lever 520 is in neutral position, registers with the notch 803 of the lock lever 804. The lock lever 804 is pivoted on the stud 805 and is urged into locking position by the spring 806 which engages a lug 807 on the locking lever 804 and the other end of which is engaged by a lug 808 struck up from the bottom of the housing. The set or neutral position is shown in Figure 8.

When the manual operating lever 520 is rotated towards closing position, then, as shown in Figures 8 and 11, the rotatable bearing 801 of the arm 800 is rotated out of the notch 803 and towards the outer edge of the locking lever 804. This action causes a depression of the locking lever 804 and serves to increase the tension on the spring 806. When manual pressure is thereafter removed from the handle 520, then the normal tendency of the bearing is to return to the notch 803 particularly since the locking bar 804 is caused to rise by reason of the spring 806.

Consequently, the tendency of the shaft 550 is to be rotated again to the neutral position shown in Figure 8 wherein the bearing 801 may register with the notch and the manual lever 520 is then returned to neutral position. When the manual operating lever is rotated in the opposite direction for tripping purposes as shown in Figure 16, then the bearing 801 again rides up out of the notch in the opposite direction but again tending to depress the locking arm 804 and therefore extend the spring 806 so that when manual pressure is again removed from the manual lever 520 its normal tendency is to return to the positions shown in Figures 8 and 2.

The notch is used to definitely fix the neutral position of the handle and to prevent the return of the handle beyond mid position as might occur if, after manual closing, the handle were released at the final closed position and allowed to move back under the influence of gravity and the spring. Excessive over travel would cause undesired tripping of the breaker.

Visual indicator

Owing to the fact that the manual lever 520 thus automatically returns to neutral position so that after the contacts have been closed they may be manually tripped or after the contacts have been tripped they may be closed, it becomes important that provision be made for some indication, preferably visual, of the contact position. Such visual indication of the contact position is provided by means of an indicator or flag 900 (Figures 19, 6 and 2) mounted on a slider 901 and guided by two studs 902—903 suitably supported from the bracket shelf, the slider 901 being itself supported by suitable washers or other means 904—905.

A bell crank lever 906 is pivotally mounted upon a stud 907 also extending from the under side of the bracket shelf and comprises a bent over portion 908 engaging a slot 909 of the slider 901. Only a portion of the flag 900 is visible through an opening or window 910, the flag carrying "on" and "off" indications. A spring 911 attached by a lug 912 to the bell crank lever 906 and at the opposite end attached to a stud 913 of the under side of the bracket shelf normally biases the bell crank lever 906 to such position that it pushes the slider 901 over to a position where the flag 900 indicates an "off" position through the aperture 910. The bell crank lever is pivotally connected at 914 to a sliding link 915 which is slidably supported by the stud 916 extending from the under side of the bracket shelf and carrying a washer 917 for support, the stud 916 registering with the slot 918 in order to permit a reciprocal sliding movement of the link 915. The link 915 carries a bent over lug 919 extending downwardly therefrom.

When the circuit breaker is closed, so that the pin 410 of the toggle is raised and also pushed towards the back end of the circuit breaker, this knee pin strikes against the bearing surface 920 of the lug 919 as shown in Figure 19 and thus in its continuing backward movement pushes the link 915 backward, thus causing the bell crank 906 to rotate about its pivot 907 thus causing it to push the slider over in the direction indicated by the arrow so that the "on" signal of the flag 900 will be visible through the aperture 910.

When the pin 410 is thereafter caused to drop by a contact opening operation, then nothing will thereafter interfere with the tendency of the spring 911 to draw the bell crank lever 906 to its original position shown in Figure 19 thus resetting the flag 900 to show the "off" indication through the aperture.

Hence, although the handle 520 returns to neutral position after a closing operation, the visual indicator above described indicates the condition of the circuit breaker.

General operation and arrangement

Various other elements may, of course, be utilized in connection with and as an integral part of the circuit breaker mechanism. Thus, for instance, as seen in Figure 2, a suitable time delay element 950 may be provided in connection with the over current coil 110 to permit the breaker to carry normal load above its trip setting for short periods of time. The specific details of the time delay elements are not herein discussed since they constitute no part of the present invention.

The various elements of the circuit breaker and the operation of each of the elements have been described in connection with the description of the members thereof. Each of the individual elements of the circuit breaker is in the present invention integrated with each of the other elements to form a unified integral operative whole.

The rotation of the manual operating lever in one direction causes the toggles to rise in the manner described, thus raising the link 34 rotating the arm 35, rotating the contact shaft and closing the contacts.

The arcing contacts meet before the main contacts are in engagement with each other. Rotating the manual operating lever in the opposite direction trips the toggles in a manner hereinbefore described, and causes the contacts to separate, the arcing contacts separating after the main contacts and the arc being established between the arcing contacts only.

The arc immediately thereafter is transferred to the arcing horns, and swept up by the magnetic blow out into the arc quencher 150.

The closing solenoid 530 may be utilized instead of the manual operating lever to close the circuit breaker and automatic tripping may be substituted for tripping by the manual lever by the use of the over current coil 110.

The over current coil 110 responds to currents in excess of predetermined values passing through the circuit breaker and may be adjusted and calibrated for the particular rating of the transformer.

Solenoid trip coils may be utilized in connection with any of the levers of the shaft 500 to rotate the same when the coil is energized by any suitable remote control means and thereby provide a remote control non-automatic tripping operation.

The arrangement of all of the parts of the circuit breaker is such that assembly thereof is extremely simple. The entire arc quencher 150 including the arcing horn 160 may be removed from the circuit breaker assembly by a single movement after the rotation of a single screw 162.

The arcing contact and horn 123 is secured over the magnetic blow out coil by readily disengageable screws and bolts 133. The blow out coil itself is readily removable by the removal of a single set of screws 119. Even the stationary main contact is itself readily removable by rotation of the screws 38.

Likewise the entire movable contact assembly may readily be disconnected from the remainder of the circuit breaker assembly by removing the bearings 140, Figure 2, from the ends of the contact shaft and removing the pin 210 from its connection between the arm 35 and the link 34 and pigtail.

And the entire toggle mechanism assembly may be readily removed for replacement and repair by means of the removal of screws 33. A solenoid mechanism may readily be added to a hand operated breaker in the field.

The flexible leads may be readily connected to the pigtail post by means of the screws 98, and the pole pieces of the magnetic blow out coil are automatically connected in place when the arc quencher is mounted in place since these pole pieces are fastened to the sides of the arc quencher.

Assembly replacement and repair are thus greatly facilitated. Separation of the various parts for any purpose whatever is made easy and simple and the general arrangement of the members on the panel 23 facilitates the mounting of this panel in a switch board with other similar circuit breakers or other switch devices.

The arrangement (including that of the trip coil, closing coil, time delay element and associated switch) is extremely compact and is confined within the narrowest limits so that even when, as in the manner hereinbefore described, certain poles of the circuit breaker are removed in order to turn the three pole circuit into a one pole or two pole circuit breaker, there is nevertheless no substantial waste space and the same panel may be utilized to mount the circuit breaker in place upon the switch board.

As far as actual use is concerned, the operator need merely follow the signals on the front of the circuit breaker as shown in Figure 2, turning the lower portion of the handle 520 to the left to close the circuit breaker, and turning it to the right to trip it open. The circuit breaker may, as is also herein described, be connected to automatic relays which are set in operation by the opening thereof so that the closing of the circuit breaker may be a function of different conditions on the line such as arise in the load resistance or the existence of a predetermined voltage different which may be caused to close a circuit to the solenoid closing member 530.

The mounting of even the movable contacts of the circuit breaker is such they may be readily removed for replacement and repair and the movable arcing contact tip which is subjected to the greatest erosion is further arranged so that the simple rotation of a screw 89 will permit the removal thereof and replacement.

In general, therefore, I have devised a circuit breaker wherein the novelty lies not merely in the specific arrangement of the individual parts thereof, and not merely in the many extremely important novel constructions comprised therein, but also in the integration and arrangement of all of these parts so that they all operate as a single unit.

In the operation of circuit breakers, various safety factors are of prime importance and it is extremely important that safety elements be integrated with the circuit breaker and made an essential part thereof. Thus I have provided not merely an improved "on-off" indication which will effectively warn against accidental incorrect operation and not merely for the provision of means for locking the circuit breaker in tripped position so that only an authorized person may close the same; but also for means for a back-up trip mechanism which will serve to immediately trip the contacts open when any attempt is made to "inch" a motor into starting position by merely touching the contacts and then permitting them to separate slightly.

Although each of the elements herein described is by itself believed to be completely novel and although the arrangement of the various parts and the integration thereof as a single unit is believed to be of the essence of the present invention, nevertheless various modifications of either the individual members or of the arrangement of the parts may now be clear to those skilled in the art.

Accordingly, I prefer to be bound, not by the specific descriptions herein, but only by the appended claims.

This application is filed simultaneously with the application of Frank J. Pokorny, for Circuit breaker operating mechanism, Serial No. 339,682, the application of Frank J. Pokorny, for Arc quencher, Patent No. 2,311,690, issued February 23, 1943, the application of William Maxwell Scott, Jr., for Circuit breaker-movable contacts, Serial No. 339,689, the application of William Maxwell Scott, Jr., for Stationary contact structure, Patent No. 2,311,701, issued February 23, 1943. In this application I have claimed those inventions and portions of the structure devised by me.

I claim:

1. A circuit breaker structure comprising an insulating panel, a pair of side plates secured to said panel and extending from the face of said panel, an insulating horizontal bar supported between the side plates and spaced from the panel, an arc chute, means on said panel for supporting one end of said arc chute, and means on said bar for supporting the opposite end of the arc chute.

2. A circuit breaker structure comprising an insulating panel, a pair of side plates secured to said panel and extending from the face of said panel, an insulating bar extending in a plane at right angles to the planes of said plates supported between the side plates and spaced from the panel, an arc chute, a removable arcing horn, means on said panel for supporting one end of said arc chute, and means on said bar for supporting the opposite end of the arc chute, said bar carrying a terminal for circuit connection to said removable arcing horn.

3. A multipole circuit breaker structure comprising an insulating panel, a pair of side plates, secured to said panel and extending from the face of said panel an insulating bar extending in a plane at right angles to the planes of said plates supported between the side plates and spaced from said panel, interphase barriers and means on said panel and on said bar for supporting and positioning said interphase barriers.

4. A multipole circuit breaker structure comprising an insulating panel, a pair of side plates secured to said panel and extending from the face of said panel, an insulating bar extending in a plane at right angles to the planes of said plates supported between the side plates and spaced from said panel, a movable contact carrying shaft rotatably supported between said side plates, an operator for said shaft; a plurality of stationary contact arrangements; a plurality of movable contact arrangements; means on said panel for removably supporting said plurality of stationary contact arrangements; means on said shaft for removably supporting said like number of movable contact arrangements, a plurality of arc chutes, and means on said panel and on said bar for removably supporting said plurality of arc chutes.

WILLIAM MAXWELL SCOTT, Jr.